United States Patent
Stedman

(10) Patent No.: US 6,864,648 B1
(45) Date of Patent: Mar. 8, 2005

(54) VECTOR FLUX MACHINE

(75) Inventor: Ian D. Stedman, Ventura County, CA (US)

(73) Assignee: Powersci, Inc, Chatsworth, CA (US)

( * ) Notice: Subject to any disclaimer, the term of this patent is extended or adjusted under 35 U.S.C. 154(b) by 0 days.

(21) Appl. No.: 10/071,910

(22) Filed: Feb. 8, 2002

(51) Int. Cl.[7] .................. H02K 17/00; H02K 19/00; H02P 7/36; H02P 7/66

(52) U.S. Cl. .................. 318/148; 318/735; 318/778; 318/244; 318/153; 310/112; 310/114

(58) Field of Search .................. 318/254, 715, 318/731, 732, 737, 705, 140, 146, 148, 147, 139, 154, 153, 778, 779, 102–105, 138, 805, 439, 727, 734–749, 701, 800; 310/219, 112, 68 D, 68 R, 114; 363/132

(56) References Cited

U.S. PATENT DOCUMENTS

| | | | |
|---|---|---|---|
| 3,582,798 A | | 6/1971 | Veale |
| 3,757,178 A | | 9/1973 | Veale |
| 4,041,541 A | * | 8/1977 | Frossard et al. .............. 361/27 |
| 4,088,934 A | * | 5/1978 | D'Atre et al. .............. 318/802 |
| 4,264,854 A | * | 4/1981 | Hawtree ..................... 318/809 |
| 4,353,020 A | | 10/1982 | Veale |
| 4,612,486 A | * | 9/1986 | Ban et al. ................... 318/254 |
| 4,634,950 A | * | 1/1987 | Klatt ......................... 318/732 |
| 4,645,991 A | * | 2/1987 | Ban et al. ................... 388/822 |

(List continued on next page.)

OTHER PUBLICATIONS

Stebbins, W., *Basics of Motors and Drives*, Energy User News, posted Jul. 24, 2000, http://www.energyusernews.com/eun/cda/article_information/fundam . . . /0,2637,7231,00.ht, Jul. 16, 2001.

Shumberg, J., *AC Drives or What Is A Drive Anyway . . . ?*, Drive Systems, Inc., http://www.drivesys.com/asdis.html, May 31, 2001.

*Basic Motor Theory*, Reliance Electric, http:///www.reliance.com/mtr/mtrhrmn.htm, May 31, 2001.

*Primary Examiner*—David Martin
*Assistant Examiner*—Eduardo Colon Santana
(74) *Attorney, Agent, or Firm*—Law Office of John F. Kacvinsky, LLC

(57) ABSTRACT

A motor that includes a stator that contains a first winding and a second winding driven by alternating currents. The rotor is arranged to rotate relative to the stator and contains a third winding and a fourth winding for generating a magnetic field with an amplitude and a phase angle relative to the alternating currents in the first and second windings of the stator. The motor includes a circuit in communication with the third and fourth windings for controlling the phase angle of the magnetic field and generating a rotating magnetic field that is in phase-lock with the alternating currents in the first and second windings of the stator. The motor also includes a control circuit and a comparator. The control circuit has an angular position feedback device for measuring the phase of the stator and the angular position and velocity of the rotor. The comparator compares the actual rotor speed and a desired rotor speed and provides a signal for varying the magnitude of the flux vector to minimize the difference.

44 Claims, 18 Drawing Sheets

U.S. PATENT DOCUMENTS

| | | | |
|---|---|---|---|
| 4,868,479 A | * | 9/1989 | Byong-Ho et al. .......... 318/721 |
| 4,922,179 A | * | 5/1990 | Nishimura ................... 322/25 |
| 4,991,429 A | * | 2/1991 | Stacey et al. ................. 73/116 |
| 5,017,853 A | * | 5/1991 | Chmiel ....................... 318/786 |
| 5,105,141 A | * | 4/1992 | Ernest ........................ 318/805 |
| 5,319,990 A | | 6/1994 | Veale et al. |
| 5,347,256 A | * | 9/1994 | Yumiki et al. ............. 336/84 C |
| 5,430,362 A | * | 7/1995 | Carr et al. ................... 318/779 |
| 5,519,275 A | * | 5/1996 | Scott et al. ................. 310/112 |
| 5,585,708 A | * | 12/1996 | Richardson et al. ........ 318/800 |
| 5,594,322 A | * | 1/1997 | Rozman et al. ............... 322/10 |
| 5,754,420 A | * | 5/1998 | Luce .......................... 363/102 |
| 5,770,909 A | * | 6/1998 | Rosen et al. ................ 310/113 |
| 5,780,990 A | * | 7/1998 | Weber ........................ 318/807 |
| 5,867,023 A | * | 2/1999 | Karagiannis et al. .. 324/207.25 |
| 5,936,373 A | * | 8/1999 | Li et al. ...................... 318/701 |
| 6,037,742 A | * | 3/2000 | Rasmussen ................ 318/807 |
| 6,313,599 B2 | * | 11/2001 | Norrkniivila et al. ....... 318/722 |

* cited by examiner

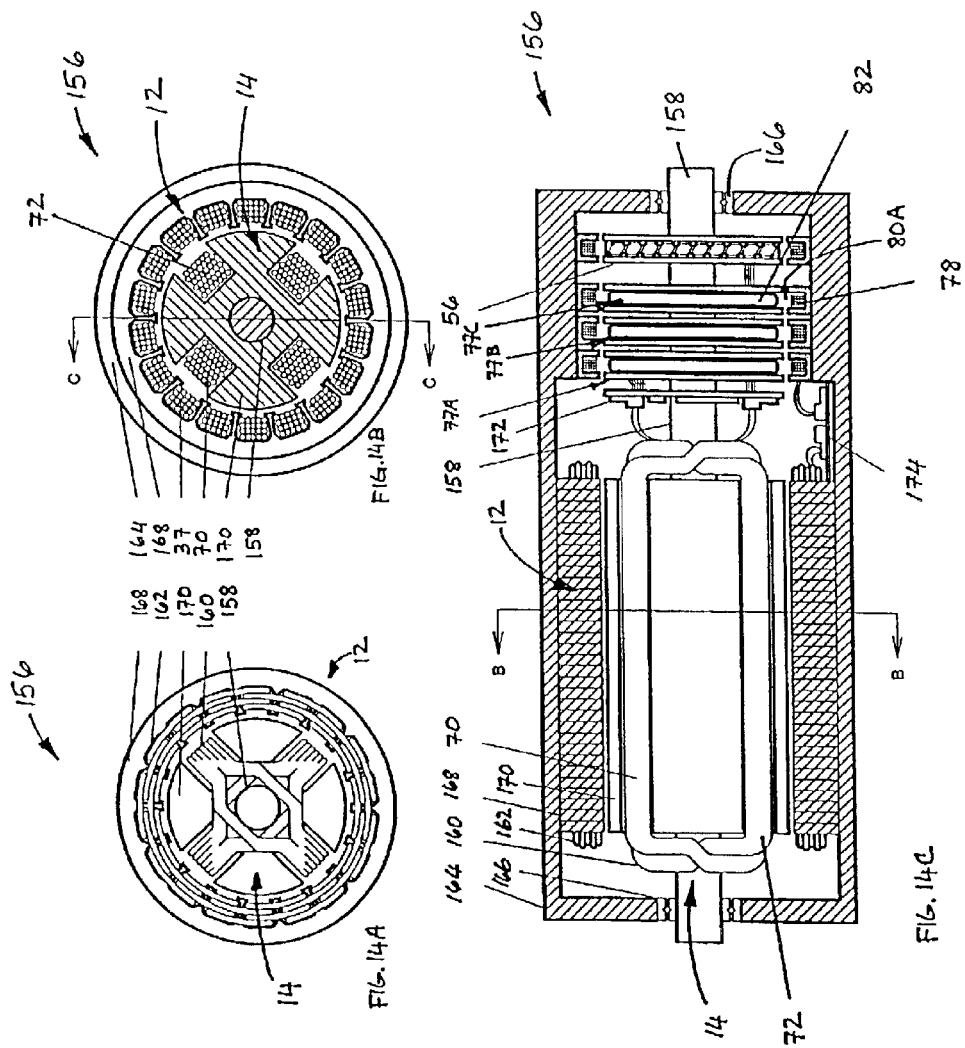

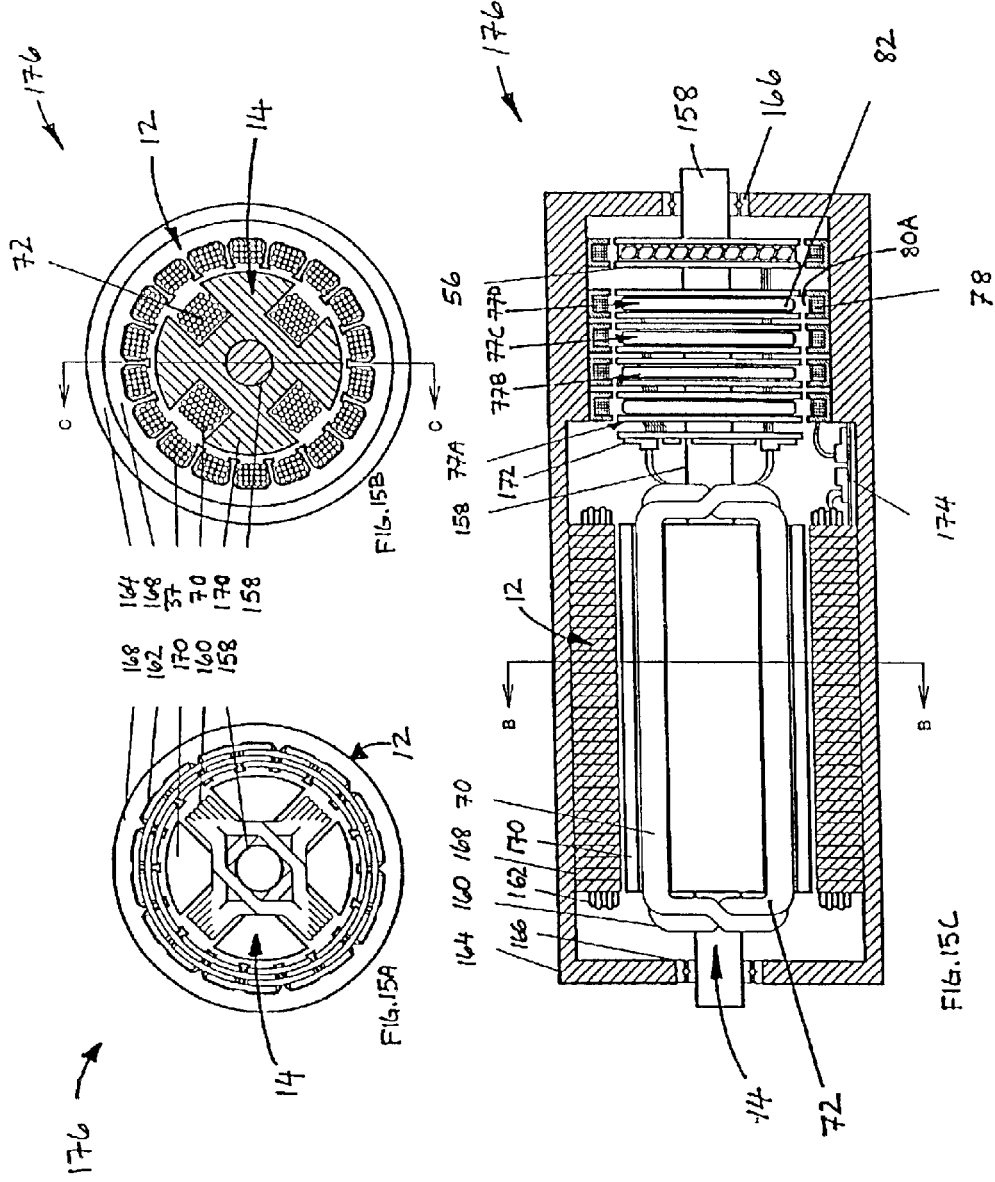

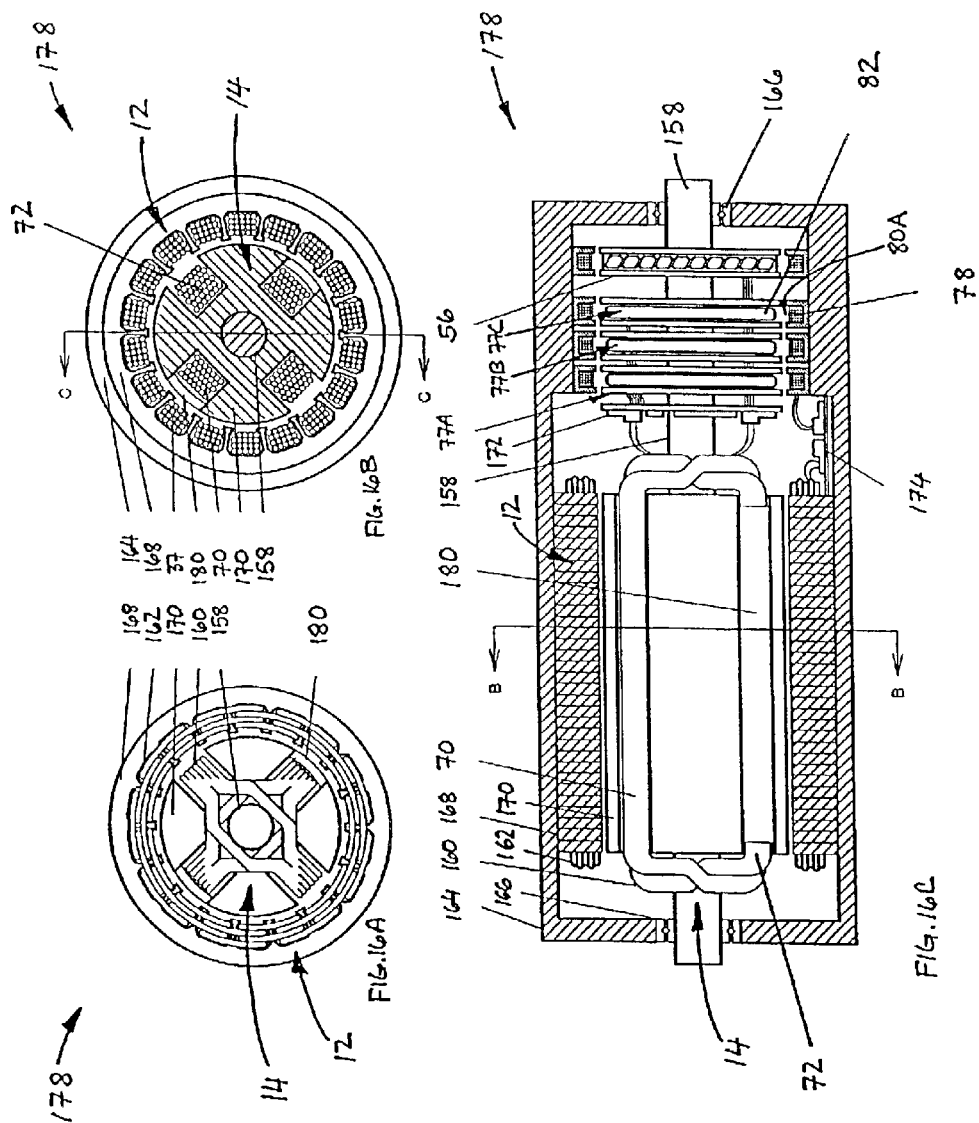

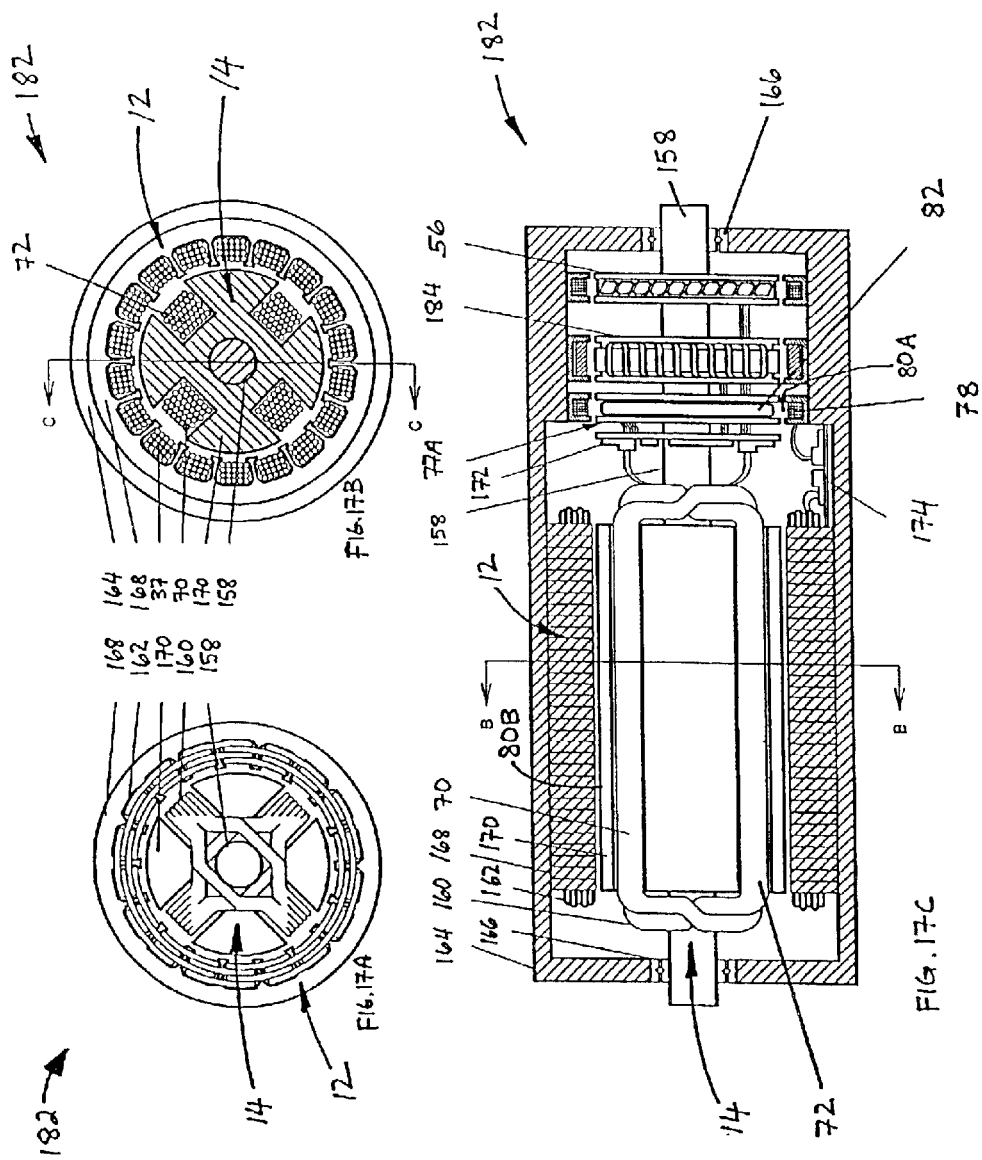

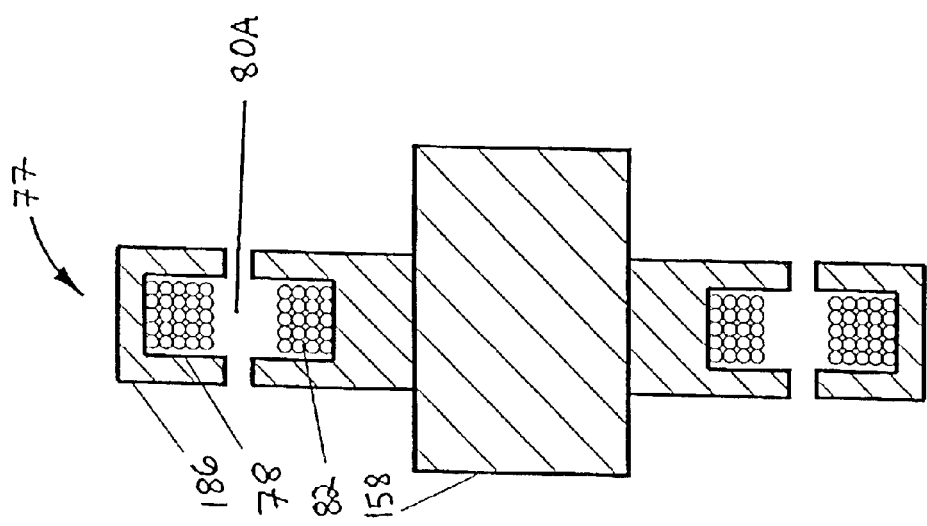
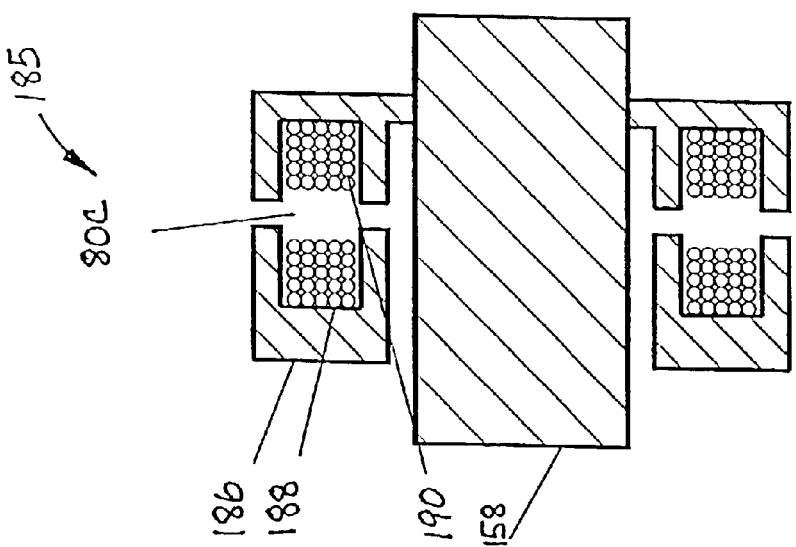

VECTOR FLUX MACHINE

BACKGROUND

1. Technical Field

The invention relates generally to vector flux machines and, more particularly to a rotating flux vector machine.

2. Description of Related Art

Alternating current (AC) induction motors have been around for nearly a hundred years. Their primary inventor was Nikolai Tesla, an innovator working at the same time as Thomas Edison. Since their inception, AC induction motors have found their way into thousands of products, from consumer products such as refrigerators and air conditioning units to industrial products such as machine tools. Nevertheless, many problems have been identified with conventional AC induction motors and only now has it become possible to ameliorate and/or eliminate many of the problems.

One problem with conventional AC induction motors is inefficiency. In some cases barely half of the electrical power that goes into the motor is manifested as shaft rotation power with the rest of the input power being dissipated as heat. Power losses occur in various places throughout the motor. One place where power is lost is in the stator windings of the motor due to resistance losses. Power is also lost as a result of slippage. Specifically, slippage results because an AC induction motor must rotate slightly slower than the magnetic field generated in the stator windings in order to generate torque. More power is lost in a conventional AC induction motor as a result of resistance in the rotor core. Power is also consumed to operate integral cooling fans that are provided for cooling the motor. Still other inefficiencies result in providing excess space within the motor housing to accommodate mechanical devices for disconnecting the starter winding and in providing space and material for the starter winding itself.

Another problem with conventional AC induction motors is heat. Most of the inefficiencies described above contribute to converting electrical power into wasted heat. This wasted heat is then removed by using a large integral fan. The fan, however, also consumes power, beats the air, and so generates additional heat. Generally speaking, a conventional AC motor generates so much heat that it cannot operate at full power continuously and must be provided with internal thermal protection devices. Furthermore, as the AC motor heats up, it become even less efficient and generates an increasing amount of heat. Eventually the excess heat contributes to premature failure of the motor. The most common premature failure from overheating is manifested as damage to the bearings.

These inefficiencies are addressed in a new machine design.

SUMMARY

According to one aspect, the present invention provides a motor that includes: a stator containing a first winding and a second winding driven by alternating currents; a rotor arranged to rotate relative to the stator, the rotor containing a third winding and a fourth winding, the third and fourth windings of the rotor generating a magnetic field having an amplitude and a phase angle relative to the alternating currents in the first and second windings of the stator; and a circuit in communication with the third and fourth windings for controlling the phase angle of the rotor generated magnetic field and generating a rotating magnetic field that is in phase-lock with the alternating currents in the first and second windings of the stator.

According to another aspect, the present invention provides a motor that includes: a stator containing a winding driven by an alternating current; a rotor arranged to rotate relative to the stator, the rotor containing a winding, and the rotor generating a magnetic field having an amplitude and a phase angle relative to the alternating current in the stator; a control transformer containing a primary winding and a secondary winding, the control transformer primary winding connected to the stator and the control transformer secondary winding in communication with the rotor winding; a control circuit in communication with the control transformer primary winding, the control circuit in communication with the rotor winding for controlling the phase angle of the generated magnetic field and for generating a rotating magnetic field that is in phase-lock with the alternating current; and an angular position feedback device in communication with the control circuit for providing the instantaneous angular position of the rotor and the instantaneous angular velocity of the rotor to the control circuit Another aspect of the present invention provides a motor that includes: a stator containing a plurality of windings driven by an alternating current; a rotor arranged to rotate relative to the stator, the rotor containing a plurality of windings, and the rotor generating a magnetic field having an amplitude and a phase angle relative to the alternating current in the stator; a plurality of control transformers each containing a primary winding and a secondary winding, the plurality of control transformers each containing the primary winding connected to the stator, the plurality of control transformers each containing the secondary winding in communication with the plurality of rotor windings; a control circuit in communication with the plurality of control transformers primary windings, the control circuit in communication with the plurality of rotor windings for controlling the phase angle of the generated magnetic field and for generating a rotating magnetic field that is in phase-lock with the alternating current; and an angular position feedback device in communication with the control circuit for providing the instantaneous angular position of the rotor and the instantaneous angular velocity of the rotor to the control circuit.

Still another aspect of the present invention provides a motor that includes: a stator containing a main winding and a capacitor phase-shifted winding, each of the main winding and the capacitor phase-shifted winding are driven by an alternating current; and a rotor arranged to rotate relative to the stator.

Another aspect of the present invention provides a motor that includes: a stator containing a first winding and a second winding driven by an alternating current; a rotor arranged to rotate relative to the stator, the rotor containing a third winding and a fourth winding, the rotor generating a magnetic field having an amplitude and a phase angle relative to the alternating current; means for controlling the phase angle of the generated magnetic field in communication with the means for transferring signals, the means for controlling in communication with the rotor winding; and means for generating a rotating magnetic field that is in phase-lock with the alternating current in communication with the means for transferring signals, the means for controlling in communication with the rotor winding.

A further aspect of the present invention provides a motor that includes: a stator containing a winding driven by an alternating current; a rotor arranged to rotate relative to the stator, the rotor containing one or more windings, and the rotor generating a magnetic field having an amplitude and a phase angle relative to the alternating current; means for transferring signals from a stationary portion of the motor to a rotating portion connected to the rotor, the means for transferring signals containing a primary winding and a secondary winding, the means for transferring signals in communication with the rotor winding; means for controlling the phase angle of the generated magnetic field in communication with the control transformer primary winding, the means for controlling the phase angle of the generated magnetic field in communication with each of the rotor windings and the means for transferring signals to and from the rotor windings; and means for generating a rotating magnetic field that is in phase-lock with the alternating current in communication with the means for transferring signals.

One more aspect of the present invention provides a motor that includes: a stator containing a plurality of windings driven by an alternating current; a rotor arranged to rotate relative to the stator, the rotor containing a plurality of windings, and the rotor generating a magnetic field having an amplitude and a phase angle relative to the alternating current; a plurality of means for transferring signals from a stationary portion of the motor to a rotating portion connected to the rotor shaft, the plurality of means for transferring signals containing a primary winding and a secondary winding, the plurality of means for transferring signals each containing a secondary winding in communication with the plurality of rotor windings; means for controlling the phase angle of the generated magnetic field and for generating a rotating magnetic field that is in phase-lock with the alternating current, the means for controlling the phase angle in communication with each of the plurality of control transformers primary windings and the plurality of rotor windings; and means for providing an instantaneous angular position of the rotor and an instantaneous angular velocity of the rotor to the means for controlling the phase angle.

Still another aspect of the present invention provides a motor that includes: a stator containing a main winding; means for phase-shifting the main winding and the means for phase-shifting driven by an alternating current; and a rotor arranged to rotate relative to the stator.

A further aspect of the present invention provides a generator that includes: a stator containing a first winding and a second winding, at least one of the first and second windings for generating an alternating current; a rotor arranged to rotate relative to the stator, the rotor containing a third winding and a fourth winding, the rotor generating a magnetic field having an amplitude and a phase angle relative to the alternating current; and a circuit in communication with the third and fourth windings for controlling the phase angle of the generated magnetic field and for generating a rotating magnetic field that is in phase-lock with the alternating current.

Still another aspect of the present invention provides a generator that includes: a stator containing a winding for generating an alternating current; a rotor arranged to rotate relative to the stator, the rotor containing a winding, and the rotor generating a magnetic field having an amplitude and a phase angle relative to the alternating current; a control transformer connected to the rotor, the control transformer containing a primary winding and a secondary winding, the control transformer secondary winding in communication with the rotor winding; a control circuit in communication with the control transformer primary winding, the circuit in communication with the rotor winding for controlling the phase angle of the generated magnetic field and for generating a rotating magnetic field that is in phase-lock with the alternating current; and an angular position feedback device in communication with the control circuit for providing the instantaneous angular position of the rotor and the instantaneous angular velocity of the rotor to the control circuit.

Still a further aspect of the present invention provides a generator that includes: a stator containing two or more windings for generating an alternating current; a rotor containing a winding arranged to rotate relative to the stator; a circuit in communication with the rotor winding for controlling the phase angle of the generated magnetic field and for generating a rotating magnetic field that is in phase-lock with the alternating current generated by the stator.

Still another aspect of the present invention provides a generator that includes: a stator containing a first winding and a second winding driven by an alternating current; a rotor arranged to rotate relative to the stator, the rotor containing a third winding and a fourth winding, the rotor generating a magnetic field having an amplitude and a phase angle relative to the alternating current; means for controlling the phase angle of the generated magnetic field in communication with each of the means for transferring signals and the rotor winding; and means for generating a rotating magnetic field that is in phase-lock with the alternating current in communication with the means for transferring signals.

Still a further aspect of the present invention provides a generator that includes: a stator containing a winding for generating an alternating current; a rotor arranged to rotate relative to the stator, the rotor containing a winding, and the rotor generating a magnetic field having an amplitude and a phase angle relative to the alternating current; means for transferring signals from a stationary portion of the motor to a rotating portion connected to the rotor, the means for transferring signals containing a primary winding and a secondary winding, the means for transferring in communication with the rotor winding; means for controlling the phase angle of the generated magnetic field in communication with each of the means for transferring signals and the rotor winding; means for generating a rotating magnetic field that is in phase-lock with the alternating current in communication with the means for transferring signals; and means for providing an instantaneous angular position of the rotor and an instantaneous angular velocity of the rotor to the means for controlling the phase angle.

Still a further aspect of the present invention provides a generator that includes: a stator containing two or more windings for generating alternating current power; a rotor containing a winding arranged to rotate relative to the stator, means for controlling the phase angle of the generated magnetic field in communication with the rotor winding; and means for generating a rotating magnetic field that is in phase-lock with the alternating current generated by the stator in communication with the rotor winding.

Still a further aspect of the present invention provides a rotor arranged to rotate relative to a stator, the stator containing a first winding driven by an alternating current. The rotor includes: a second winding for generating a magnetic field having an amplitude and a phase angle relative to the alternating current; and a circuit in communication with the second winding for supplying power to the second winding and for generating a rotating magnetic field.

Yet another aspect of the present invention provides a rotor arranged to rotate relative to a stator, the stator containing a first winding for generating an alternating current. The rotor includes: a second winding; means for generating a magnetic field having an amplitude and a phase angle relative to the alternating current; and means for supplying power to the second winding in communication with the means for generating the magnetic field.

Yet another aspect of the present invention provides a control circuit for measuring a phase of a stator containing a stator winding, an angular position of a rotor and velocity of the rotor, the rotor containing a rotor winding, the rotor rotating relative to the stator and the rotor winding generating a flux vector, the control circuit for driving the rotor flux vector such that the rotor flux vector remains in a locked phase relationship with an alternating current phase of the stator. The control circuit includes: an angular position feedback device for measuring an angular velocity and a position of the rotor, and a comparator in communication with the angular position feedback device for comparing an instantaneous rotor speed and a desired rotor speed and varying the magnitude of the rotor winding generated flux vector for minimizing the difference between the instantaneous rotor speed and the desired rotor speed.

Another aspect of the present invention provides a control circuit for measuring a phase of a stator containing a stator winding and an angular position and velocity of a rotor containing a rotor winding, the rotor rotating relative to the stator and the rotor winding generating a flux vector, the control circuit driving the rotor flux vector such that the rotor flux vector remains in a locked phase relationship with an alternating current phase of the stator. The control circuit includes: means for measuring an angular velocity and position of the rotor; means for comparing an instantaneous rotor speed and a desired rotor speed in communication with the means for measuring angular velocity and position; means for varying the magnitude of the rotor winding generated flux vector; and means for minimizing the difference the instantaneous rotor speed and the desired rotor speed.

Yet a further aspect of the present invention provides a method of controlling a motor including a rotor containing a rotor winding and a stator containing a stator winding. The method includes: simultaneously controlling a stator and a rotor arranged to rotate relative to the stator; measuring a torque ripple generated by the motor, and correcting the torque ripple.

Yet another aspect of the present invention provides a method of controlling a rotor that includes: determining an angular position of a rotor, determining a rotor flux vector amplitude; separating the rotor flux vector into two separate components; and driving each separate rotor flux vector component in accordance with a total rotor flux vector magnitude.

Yet a further aspect of the present invention provides a method of transferring signals to a rotor that includes: generating a signal to be transferred to the rotor; encoding the signal to an analog waveform; transferring the analog waveforms to a primary portion of a rotary transformer; and transferring the analog waveforms across an air gap from the primary portion of the rotary transformer to a secondary portion of the rotary transformer.

Another aspect of the present invention provides a method of controlling a rotating magnetic flux vector generated in a stator containing a winding by a rotor containing a winding. The method includes: determining a phase angle of the rotor; determining a phase angle of an alternating current source supplying power to the stator winding; comparing the phase angle of the rotor and the phase angle of the alternating current source; and controlling the phase angle of the generated magnetic field and generating a rotating magnetic field that is in phase-lock with the alternating current in accordance with the difference between the phase angle of the rotor and the phase angle of the alternating current source.

These and other inventions are addressed in a new machine design.

BRIEF DESCRIPTION OF THE DRAWINGS

The present invention will be described in conjunction with the following figures, wherein:

FIG. 14A illustrates one embodiment of an end view of a first motor according to the present invention;

FIG. 14B illustrates one embodiment of a section view of a first motor according to the present invention;

FIG. 14C illustrates one embodiment of a cutaway side view of a first motor according to the present invention;

FIG. 15A illustrates one embodiment of an end view of a second motor according to the present invention;

FIG. 15B illustrates one embodiment of a section view of a second motor according to the present invention;

FIG. 15C illustrates one embodiment of a cutaway side view of a second motor according to the present invention;

FIG. 16A illustrates one embodiment of an end view of a third motor according to the present invention;

FIG. 16B illustrates one embodiment of a section view of a third motor according to the present invention;

FIG. 16C illustrates one embodiment of a cutaway side view of a third motor according to the present invention;

FIG. 17A illustrates one embodiment of an end view of a fourth motor according to the present invention;

FIG. 17B illustrates one embodiment of a section view of a fourth motor according to the present invention;

FIG. 17C illustrates one embodiment of a cutaway side view of a fourth motor according to the present invention;

FIG. 18A illustrates one embodiment of a first mechanical rotary transformer showing a side-by-side layout trading off shaft space for a smaller required total diameter according to the present invention; and FIG. 18B illustrates one embodiment of a second mechanical rotary transformer showing a layout trading off extra diameter for a smaller required shaft length according to the present invention.

DESCRIPTION

Figure 1:
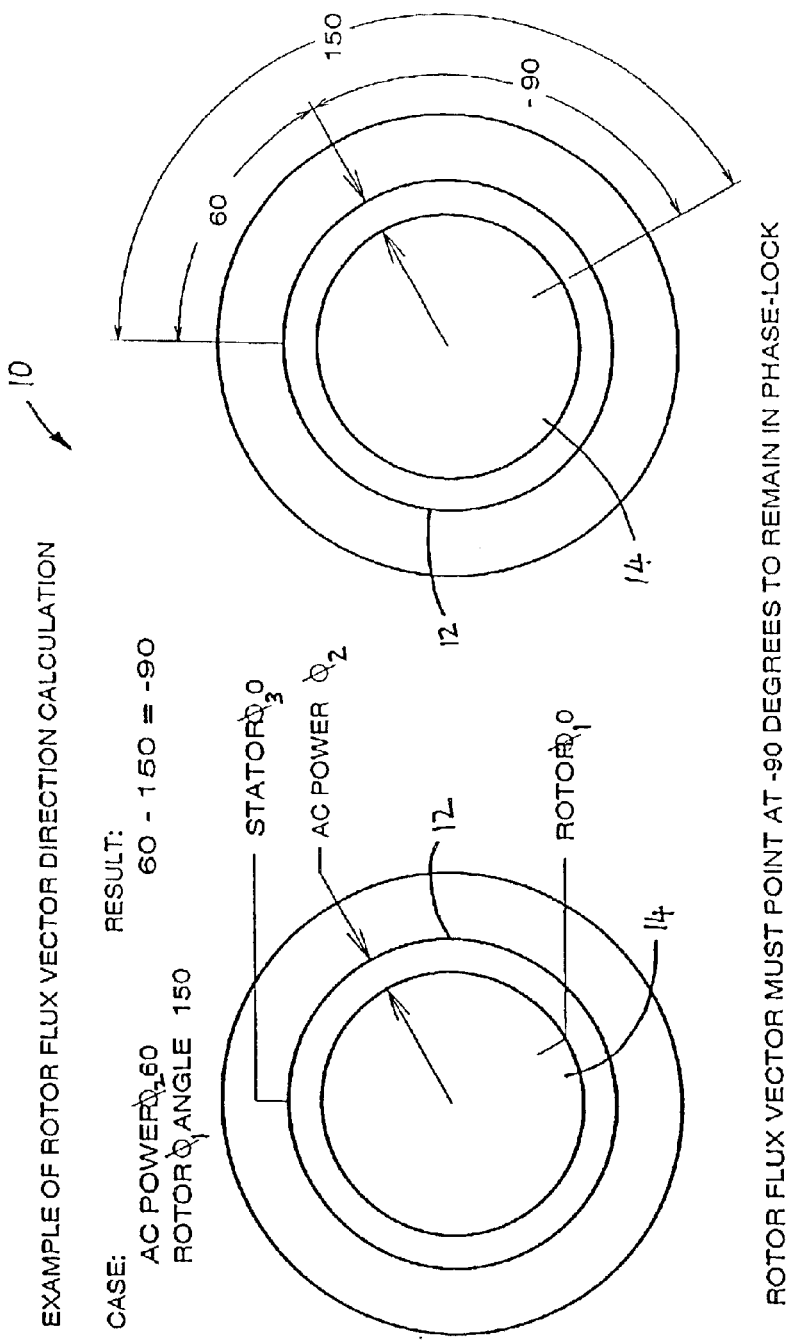
FIG. 1 illustrates one embodiment of a calculation for determining a direction of a rotor flux vector according to the present invention.

It is to be understood that the figures and descriptions of the present invention have been simplified to illustrate elements that are relevant for a clear understanding of the present invention, while eliminating, for purposes of clarity, other elements of a conventional nature.

In one embodiment, the invention provides a rotating vector flux machine, also known as a rotating magnetic flux machine. The operation of various embodiments of the rotating vector flux machine and the construction will be described with reference to the figures and the description that follows.

In one embodiment, the invention also provides a closed loop feedback controlled rotating vector flux motor. The motor generally includes a rotor, a rotor winding, a stator and a stator winding, the rotor being arranged such that the rotor rotates relative to the stator. As the rotor rotates relative to the stator, the rotor winding generates a rotating magnetic field (i.e., a rotating flux vector). The direction in which the rotating magnetic field rotates is controlled such that the rotating magnetic field remains in phase-lock with the incoming alternating current (AC) flowing in the stator windings. The amplitude of the rotating magnetic field can be separately controlled in order to influence the mechanical activity of the rotor. Those skilled in the art will appreciate that some controlling devices are generally required for measuring a phase angle of the phase angle of the incoming AC, the rotor angular position and the current angular velocity. In one embodiment, a closed-loop control system is provided for measuring the present angular velocity of the rotor and applying a current to the rotor winding for influencing the rotating magnetic field and generating a force for accelerating, decelerating and keeping the angular velocity of the rotor constant.

In one embodiment, the rotor can be constructed with a winding such that electrical currents injected therein will generate a rotating magnetic field. The rotating magnetic field can be considered a rotating flux vector. In order to generate such a rotating flux vector, the electrical current can be sequenced though each individual rotor winding. In one embodiment, two windings disposed at a relationship of ninety degrees can be driven with a sine and cosine relationship.

In one embodiment, the stator can be constructed using a winding disposed in a laminated material. The stator can include, for example, a main winding and another winding disposed at a ninety degree phase shift, which is added for starting purposes. The stator also can include one or more devices, e.g., a switch, for switching off the rotor at a predetermined rotor speed. Those skilled in the art will appreciate the stator can be controlled electronically using, for example, embedded microprocessors or computer controllers, which are well known in the art.

In one embodiment, an AC voltage source can be used to supply electrical power to the stator winding. For example, the AC line current supplied from a typical household wall socket can be used to supply the AC electrical power.

In one embodiment, the angular position of the rotor can be measured using a position feedback device. These devices can be selected from a wide variety of known devices such as, for example, optical encoders, magnetically coupled resolvers and the like. The angular phase of the incoming AC electrical power is also measured. The magnetic field produced by the rotor is generally controlled to be directionally phase-locked with the alternating current in the stator winding. Varying electrical currents also can be provided through the windings of the rotor in order to influence the magnitude of the magnetic flux and to mechanically control the action of the rotor. This also can be considered to be the length, or magnitude, of the rotating flux vector.

To control the rotor windings one or more electronic control circuits can be disposed directly on the rotor. In one embodiment, if the electronic control circuits are disposed directly on the rotor, electrical power is delivered to the control circuit and the rotor windings can be controlled directly. In another embodiment, if the electronic circuits are placed from the rotor (i.e. outside of the rotor), the rotor winding control signals are delivered to the rotor. In either example recited above, a device will generally be required for transferring electrical power from a stationary device (e.g., the stator and any external framework and power connections) to a moving device (e.g., the rotor) and vice-versa. In one embodiment, brushes or wheels on a track can be used to accomplish this function, for example. In another embodiment, non-contact power and signal transmission devices can be used to accomplish the function of transferring electrical power form a moving to a stationary portion of the motor and vice-versa, for example. In a further embodiment, radio waves can be used to communicate between the stationary and rotating parts of the motor, for example. Still in another embodiment, rotary transformers can be used as non-contact methods for transmitting power between moving and stationary portions of the motor, for example. In yet another embodiment, a built-in generator can be provided such that the rotor can generate its own power, for example. Those skilled in the art will appreciate that while the motor is stationary, the rotor can be powered by rectifying the currents induced in the rotor windings by the magnetic flux generated by a powered stator. The rotor's angular position can be provided, either by something as simple as a once-around flag or as complex as a resolver or encoder, for example.

Some form of electronic control circuit will be required for controlling the vector flux machine according to the invention. The electronic control circuits can be used at least for the purpose of providing some form of feedback. Those skilled in the art will appreciate that without some form of feedback mechanism, the vector flux machine can become dynamically unstable. The electronic control circuit can generally be implemented using commercially available and well known microprocessors, micro-controllers, discrete components such as transistors and diodes, mechanical switches and relays, or some combination thereof, for example.

In one embodiment, using a microprocessor-based controller for controlling the stator and rotor windings provides some added benefit. For example, the microprocessor controller can be used to communicate with other externally located control systems and to communicate with microprocessors located in other motors. The microprocessor-based controllers can provide very accurate control of the motor's speed in response to internally programmed predetermined speeds or from external sources in communication with the microprocessor sending commands for certain speeds. The microprocessor-based controller also can maintain a motor in phase-lock with other similar motors, which may be desirable, for example, when using multiple motors for driving a conveyor belt. Other possible features can include current limiting and temperature limiting controls. In one embodiment, these can be implemented with or without using switches and fuses.

In one embodiment, the invention provides a motor built with a stator such that the main windings of the stator and other winding(s) can be electrically driven continuously. The stator can be wound with two or more phases that are appropriately electrically separated. In one embodiment, the phases can be disposed ninety degrees apart. One phase of the stator can be driven continuously using the incoming AC power, e.g., from the household wall socket. The other phases can be driven from the same incoming AC power, but generally after being rectified to DC power and then switched into the end of the other winding(s) with high-efficiency transistors, under electronic control. In one example, a microprocessor-based controller can control the transistors. One benefit of utilizing this method for controlling the phase of the stator is that it permits the selection of the direction of rotation at start-up. In addition, controlling both the rotor and the stator simultaneously permits measurement and correction of torque ripple, which is a cyclic variability of available torque.

In one embodiment, the rotor can be constructed using a permanent magnetic material and a control winding. This provides efficiency gains when the rotor is mechanically rotating such that to remain in phase-lock with the stator the field of the rotor does not rotate relative to the rotor. These gains are accomplished by minimizing the current provided to the control winding at the designed speed because the magnetic material can provide the bulk of the required magnetic flux. In one embodiment, the permanent magnetic material can be magnetized by the windings while the motor is in operation.

In one embodiment, the designs of the stator and rotor according to the present invention can be applied to a generator design as well. In one embodiment, a generator can be provided such as to output an alternating current at exactly 60 Hz. In another embodiment, the generator can provide any predetermined or specified AC frequency, while the input shaft, driven by some external device, varies in rotational velocity. In one embodiment, this can be accomplished by rotating the magnetic field of the rotor to advance or retard the current peak in the stator windings such that the sum of the rotor's mechanical rotation and electrical rotation result in a 60 Hz AC cycle.

Now turning to FIG. 1, one embodiment of a flux vector direction calculation 10 for determining a direction of a rotor flux vector according to the present invention is illustrated. This is one embodiment of a sample of the vector mathematics that can be executed by a microprocessor or other control circuit. The flux vector direction calculation 10 is performed to operate a rotating vector flux motor that includes a stator 12 and a rotor 14, for example. The direction of the rotor flux vector is computed according to the rotor angle $\Phi_1$ and the AC flux vector angle $\Phi_2$ relative to the stator zero point $\Phi_3$. The rotor flux vector direction is driven to maintain the rotor flux vector in phase-lock with the AC flux vector. In the example illustrated in FIG. 1, the rotor angle $\Phi_1$ is 150°, and the AC flux vector angle $\Phi_2$ is 60° relative to the stator zero point $\Phi_3$. Therefore, according to the flux vector direction calculation 10, the rotor flux vector must point at −90° to remain in phase-lock with the AC flux vector.

Figure 2:
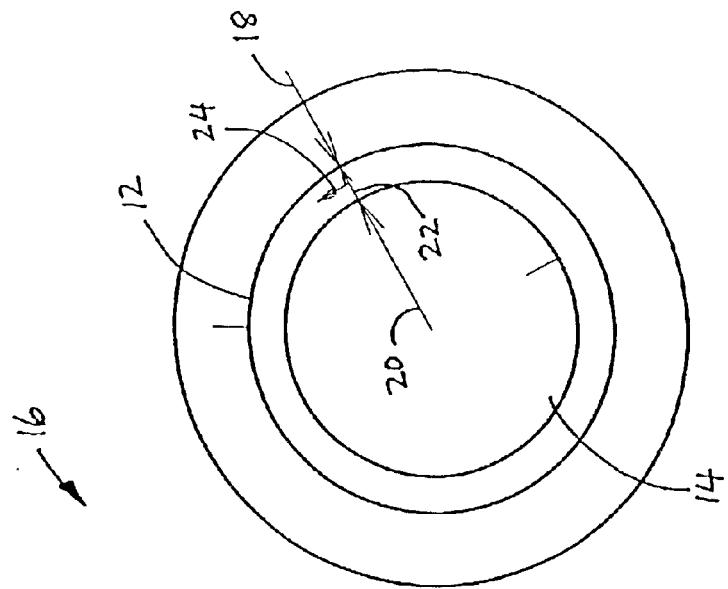
FIG. 2 illustrates one embodiment of a calculation for determining the magnitude of a rotor flux vector according to the present invention.

FIG. 2 illustrates one embodiment of a flux vector magnitude calculation 16 for determining the magnitude of a rotor winding flux vector 20. The relative magnitudes of the stator winding flux vector 18 and the rotor winding flux vector 20 are used to determine whether the rotor 14 will accelerate clockwise, counterclockwise or remain at the same speed (when the vector magnitudes are equal). Any force contrary to a pre-existing velocity will cause a deceleration of the rotor 14 to the same degree. As illustrated in FIG. 2, a stator winding flux vector 18 magnitude of three units added to a rotor winding flux vector 20 magnitude of four units results in a resultant flux vector 22 magnitude of one unit and a resultant force vector in the direction 24. Accordingly, in this example the rotor 14 will accelerate counterclockwise.

Figure 3:
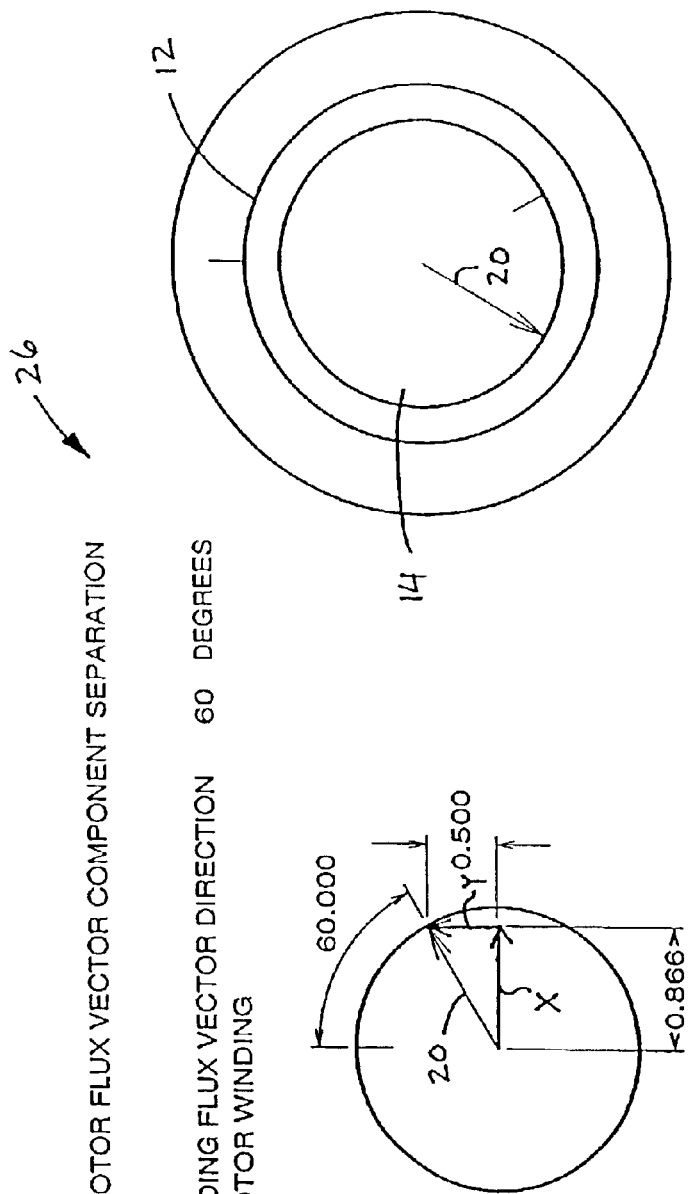
FIG. 3 illustrates one embodiment of a calculation for determining a component of a rotor flux vector separation according to the present invention.

FIG. 3 illustrates one embodiment of a rotor flux vector component calculation 26 for determining a component of a rotor winding flux vector 20. The rotor winding flux vector 20 is trigonometrically separated into components X and Y, and applied to each winding on the rotor 14. As illustrated, component X has a scaling factor of 0.866 and component Y has a scaling factor of 0.500. The results are calculated for two windings at a 90° separation.

Figure 4:
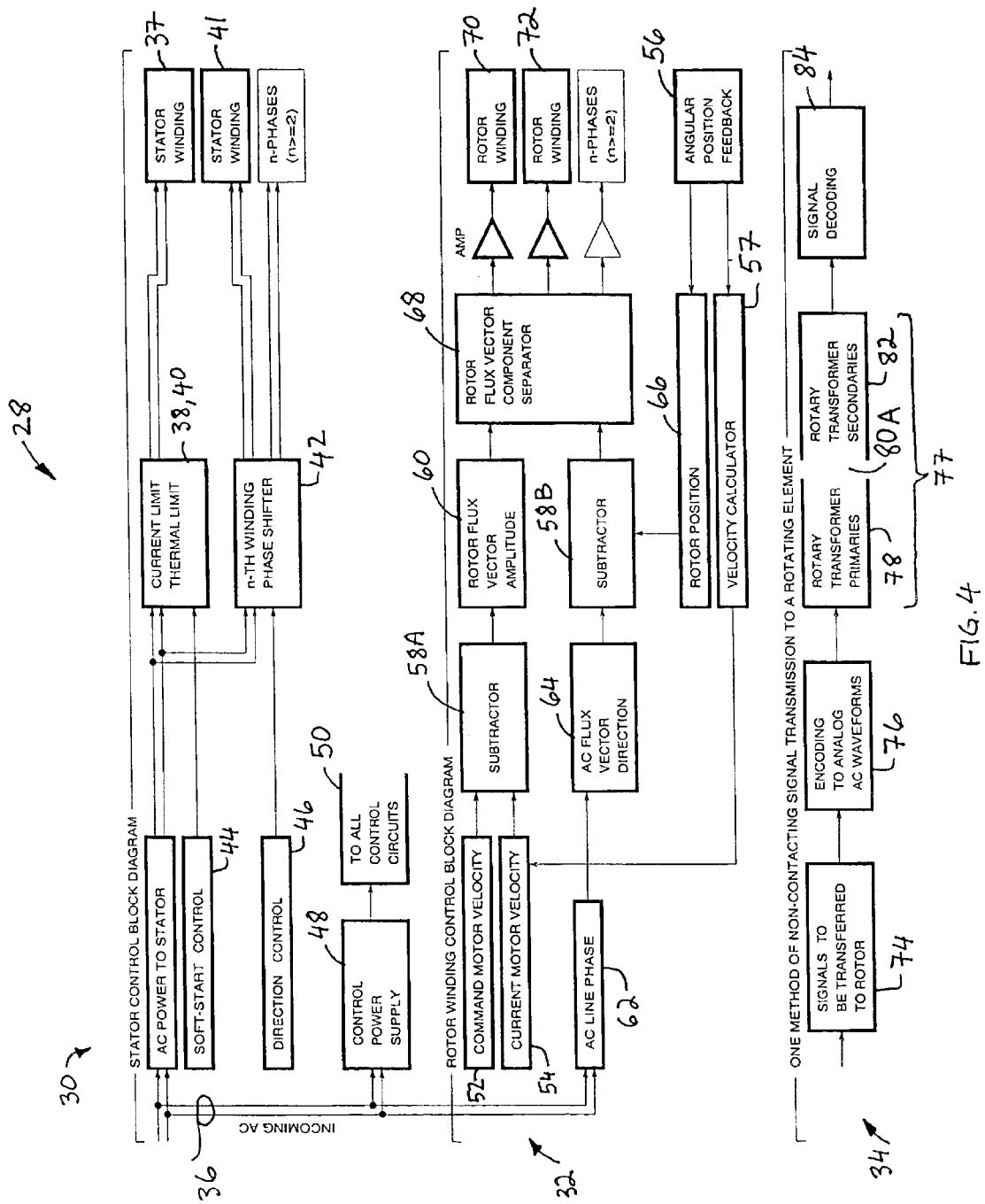
FIG. 4 illustrates one embodiment of a block diagram of a method for controlling a rotating vector flux motor according to the present invention.

FIG. 4 illustrates one embodiment of a block diagram 28 of various controlling features of one embodiment of a rotating vector flux machine. For example, a stator control block diagram 30, a rotor winding control block diagram 32 and a non-contacting method of 34 of transmitting signals from a stationary portion of a machine, e.g., a motor, a generator and the like, to a rotating element of the machine, e.g., a rotor 14.

Turning to the stator control block diagram 30, an incoming AC electrical power line 36 drives a first stator winding 37 through a current-limiting control device 38 and a thermal-limiting control device 40. The incoming AC electrical power line 36 also drives other stator winding(s) 41 through a phase-shifting circuit 42. (See for example the starting circuits illustrated in FIGS. 5–7 and the accompanying description below.) There also can be provided as an option, a soft-start control circuit 44 that further limits the current in the stator 12. The soft-start control circuit 44 helps to eliminate excessive inrush current to the stator 12. As an option, a direction control circuit 46 also can be provided to influence the out-of-phase stator windings 37 for selecting a direction of rotation at the time of startup of the vector flux machine. Furthermore, power to drive the stator control circuits 50 and devices can be provided from the incoming AC electrical power line 36 to the control power supply 48.

Turning to the rotor winding control block diagram 32, the command motor velocity 52 can be set either internally or externally from the rotor 14. The current (i.e., instantaneous) motor velocity 54 is measured using an angular position feedback device 56 and the motor velocity 54 is fed to a velocity calculator 57. The difference between the command motor velocity 52 and the instantaneous motor velocity 54 is determined by comparing the two quantities in a subtractor 58B. The difference is then further processed as the rotor flux vector amplitude 60.

The phase 62 of the incoming AC electrical power is measured from the AC electrical power line 36 relative to the stator's 12 zero position $\Phi_3$. The phase 62 of the incoming AC electrical power is used to determine the AC flux vector direction 64. The angular position 66 of the rotor 14 can be measured using the angular position feedback device 56 relative to the stator's 12 zero position $\Phi_3$. The difference between the AC flux vector direction 64 and the rotor's 14 angular position 66 is the direction of the rotor winding flux vector 20. Summing the direction of the rotor winding flux vector 20 and the rotor angular position 66 is generally equal to the AC flux vector direction 64. The rotor winding flux vector 20 is then trigonometrically separated into its X and Y components, with the two rotor windings 70, 72 being at 90° separation, by a rotor flux vector component separator 68. Each rotor winding 70, 72 is driven with their respective X, Y component scaling factor times the calculated vector flux magnitude.

Those skilled in the art will appreciate that somewhere within the rotor winding control circuitry the control and power signals must be moved from a stationary portion of the machine (i.e., the stator 12) to a rotating portion of the machine (i.e., the rotor 14). One method for achieving this type of transference is illustrated generally at 34, wherein a rotary transformer 77 and its affiliated circuitry are used for converting the signals to be transferred 74 to the rotor 14 to an AC waveform by an analog AC waveform encoder 76 (hence transformable). The encoded AC waveforms are then passed from the rotary transformer primaries 78 across an air gap 80A to the rotary transformer secondaries 82. The signals 74 are then re-interpreted as useful signals by a signal decoder 84 and can be used by a control circuit to provide the necessary current control to the rotor windings 70, 72. A further description of the conversion to AC waveforms process is provided in the description associated with FIGS. 8–10 below including a special signaling timing diagram. A more detailed description of the reinterpretation as useful signals is provided in the description associated with FIGS. 11 and 12 below.

Those skilled in the art will appreciate that the signals 74 can be inserted anywhere in the circuit between the incoming AC electrical power line 36 and the rotor windings 70, 72. If a control circuit is required on the rotor 14, however, electrical power can be transferred to the rotor 14. Also, electrical power can be included in the encoded rotor winding drive signals or can be derived from the rotor 14 itself. In one embodiment, the rotor 14 can be provided with a built-in generator 152 as illustrated for example in FIG. 13 and FIG. 17C. Accordingly, the generator 152 requires only the incoming phase 62 of the incoming AC electrical power to be transmitted to the rotor 14.

Figure 5:
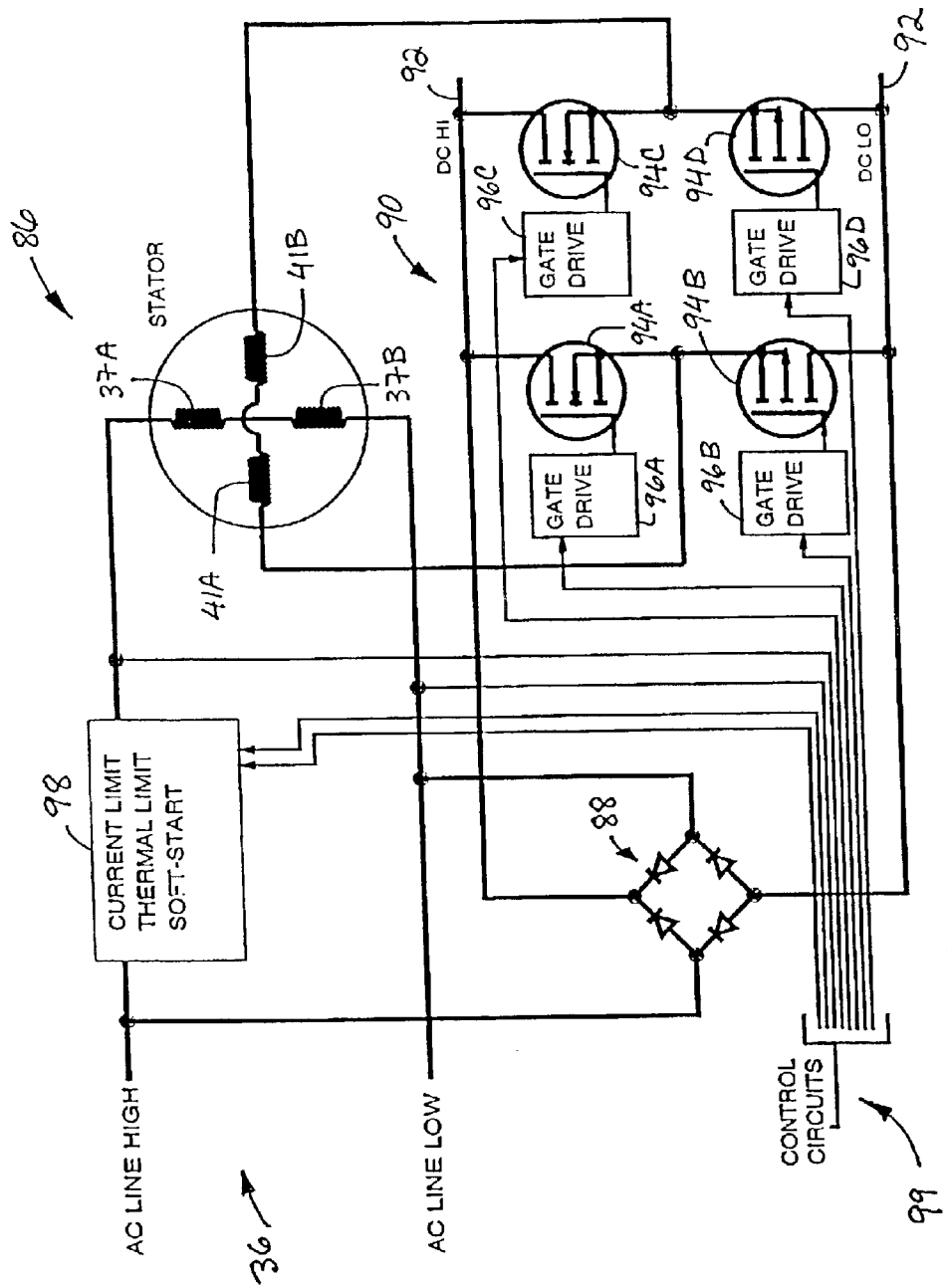
FIG. 5 illustrates one embodiment of a start circuit according to the present invention.

FIG. 5 illustrates one embodiment of a schematic of a first start circuit 86. The first start circuit 86 is an electrical schematic of one embodiment of a method of using a microprocessor-based controller or other types of controllers for controlling the stator 12 such that the stator windings 37A, B and 41A, B can be energized during normal operation. A first phase of the stator 12 is driven directly by the incoming AC electrical power line 36. For example, the stator windings 37A, B are driven by the first phase. Further, a rectifier 88 for supplying DC voltage rails 92 to the drive circuit 90 rectifies the voltage provided by the incoming AC electrical power line 36. The stator windings 41A, B are driven by an H-bridge of MOSFET transistors 94A, B, C, D disposed across the DC voltage rails 92. Those skilled in the art will appreciate that the MOSFET transistors 94A, B, C, D can be controlled by a microprocessor-based controller embedded within the motor controls. For example, in one embodiment, the MOSFET transistors 94A, B, C, D are controlled by gate drive circuits 96A, B, C, D, respectively, which are controlled by the control circuits 99. Those skilled in the art will appreciate that the control circuits 99 can include microprocessor-based devices. In one embodiment, a one-phase circuit 98 can be used to implement one or more additional functions. For example, the one-phase circuit 98 can provide a current limiting, a thermal limiting and a soft-starting function. The DC voltage rails 92 can be provided to the control circuits 99, the rotary transformer signal encoding 76, as well as other circuits.

Figure 6:
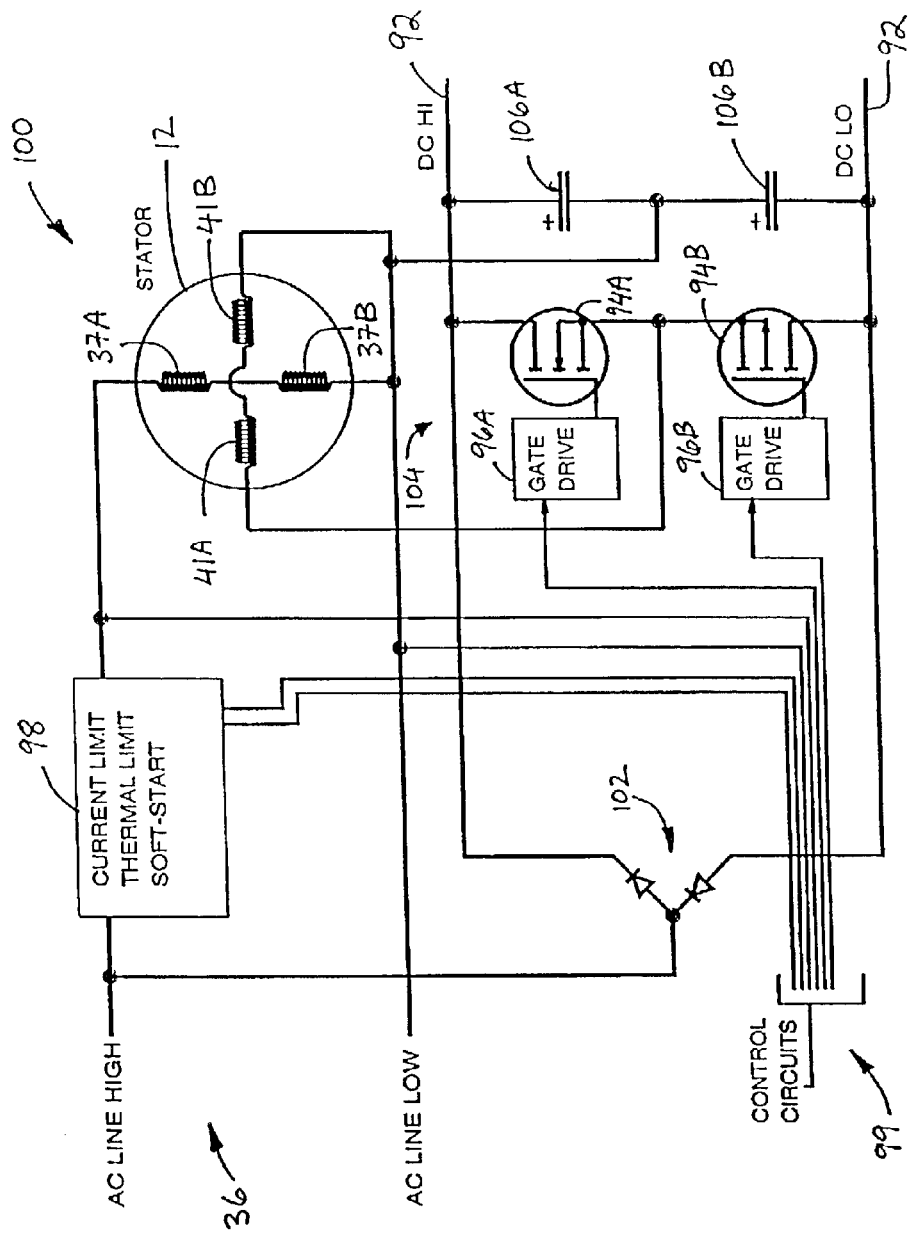
FIG. 6 illustrates another embodiment of a start circuit according to the present invention.

FIG. 6 illustrates one embodiment of a schematic of a second start circuit 100. The second start circuit 100 is an electrical schematic of one circuit that uses a microprocessor-based controller or other types of controllers for controlling the stator 12 such that the stator windings 37A, B and 41A, B can be energized during normal operation of the vector flux machine. A first phase of the stator 12 is driven directly by the incoming AC electrical power line 36. A rectifier 102 provides the drive circuit 104 with DC voltage rails 92 by rectifying the voltage from the incoming AC power line 36. One end of the winding 41A is driven by a half-bridge of MOSFET transistors 94A, B across the DC voltage rails 92, while the end of the other winding 41A is connected only to one end of winding 41B. The other end of winding 41B is coupled via two capacitors 106A, B to the DC voltage rails 92. The MOSFET transistors 94A, B can be driven, for example, by gate drives 96A, B, respectively. Those skilled in the art will appreciate that control circuits 99 within the motor that can include devices such as a microprocessor-based controller for example control the MOSFET transistors 94A, B.

Figure 7:
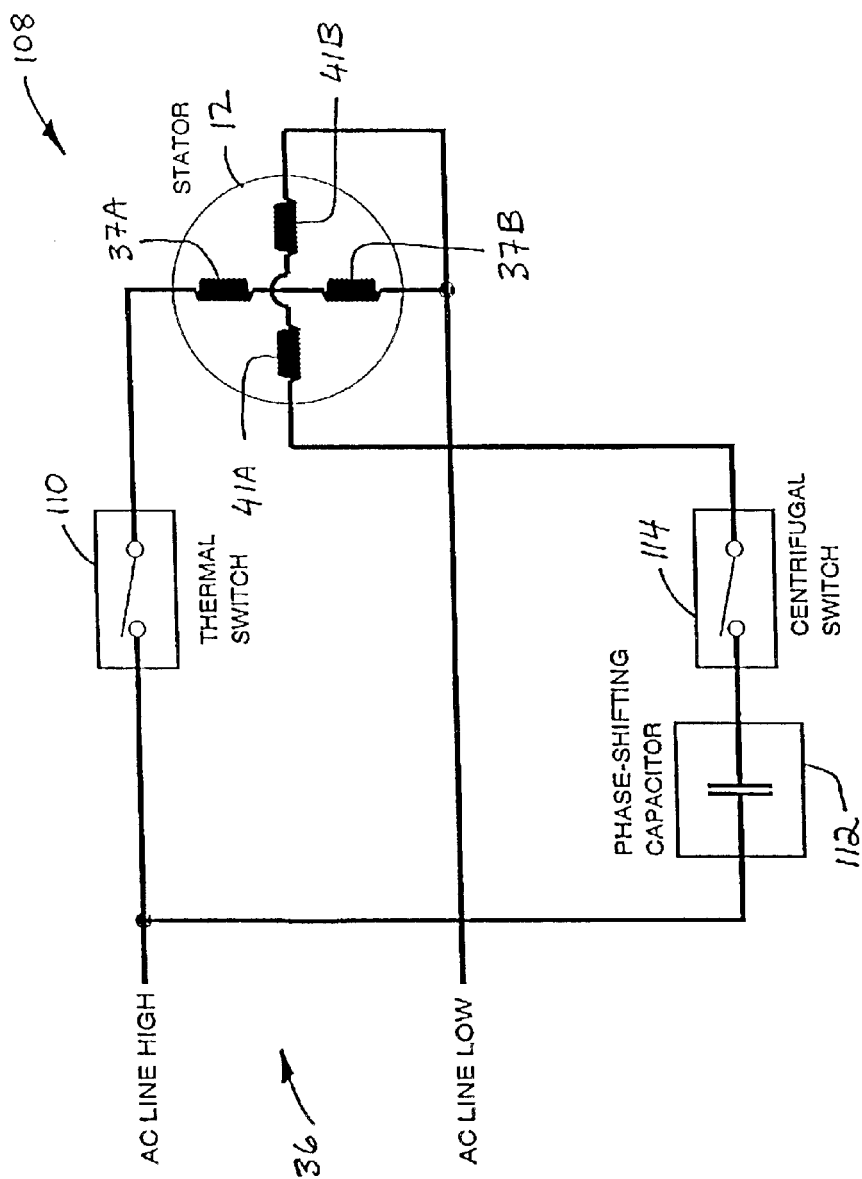
FIG. 7 illustrates yet another embodiment of a start circuit according to the present invention.

FIG. 7 illustrates one embodiment of a schematic of a third start circuit 108. The third start circuit 108 is an electrical schematic of one circuit for connecting the third start circuit 108 to the stator 12. One phase of the rotor windings 37A, B are driven by the AC electrical power line 36 through a normally closed thermal switch 110 that is used generally for overheating protection. The other phases of the rotor windings 41A, B are driven through a phase-shifting capacitor 112 and a normally closed centrifugal switch 114. The centrifugal switch 114 opens when the rotor 14 reaches a predetermined speed (e.g., 500 RPM) and then disconnects that phase entirely. In one embodiment, the third start circuit 108 does not include any current limit protection.

Figure 8:
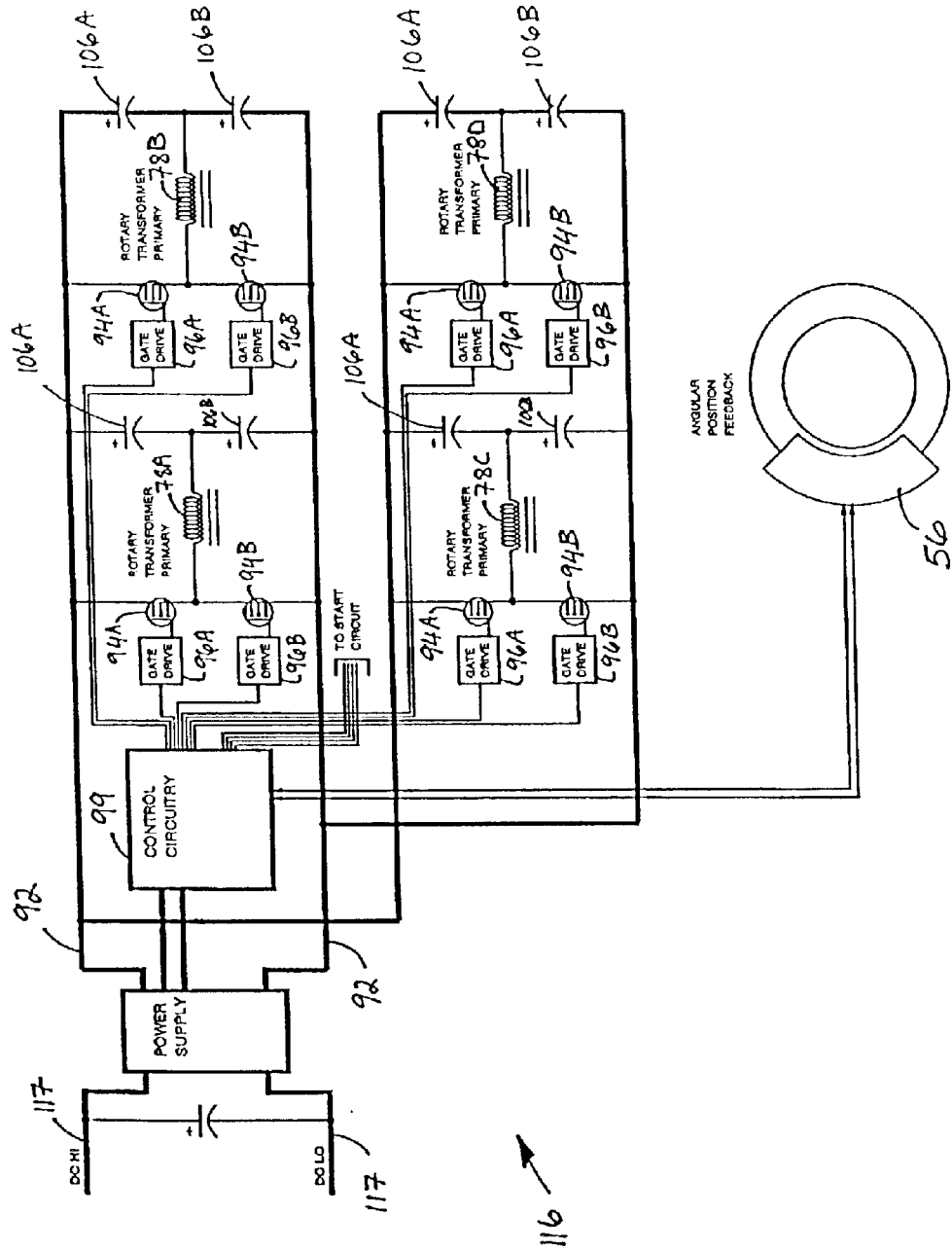
FIG. 8 illustrates one embodiment of a first control transformer drive circuit according to the present invention.
Figure 11:
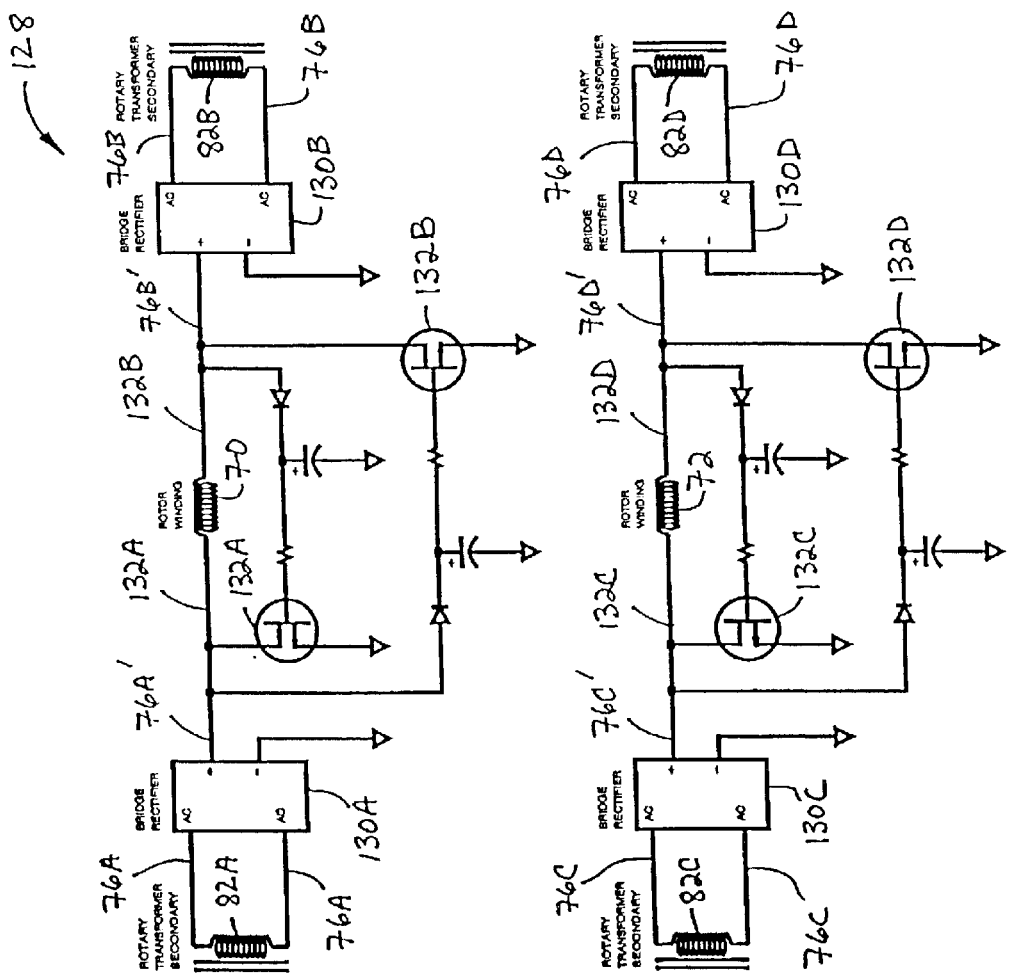
FIG. 11 illustrates one embodiment of a first rotor control circuit according to the present invention.

FIG. 8 illustrates one embodiment of a schematic of a first control transformer drive circuit 116 for driving and controlling four rotary transformers 77. The rotary transformers 77 include four rotary transformer primaries 78A, B, C, D and four rotary transformer secondaries 82A, B, C, D (as shown in FIG. 11). The rotary transformer primaries 78A, B, C, D and the rotary transformer secondaries 82A, B, C, D are separated by an air gap 80A. The first control transformer drive circuit 116 is one embodiment of a circuit that can be used for driving the four rotary transformer primaries 78A, B, C, D. The DC voltage that develops on the DC voltage bus 117 is rectified from the voltage supplied by the AC electrical power line 36 as shown in the start circuit 86 in FIG. 5, for example. Each of the rotary transformer primaries 78A, B, C, D can be driven by the half-bridge of MOSFET transistors 94A, B and can be AC coupled to the DC voltage rails 92 via capacitors 106A and B. The half-bridge of MOSFET transistors 94A, B can be driven by the gate drives 96A, B, which are controlled by the control circuitry 99. In one embodiment of the first control transformer drive circuit 116, the incremental cost of adding a sophisticated starting circuit (e.g., start circuit 86 and start circuit 100) is generally low. The first control transformer drive circuit 116 also can include an angular position feedback control device 56 for providing the angular velocity and angular position of the rotor 14, for example.

Figure 9:
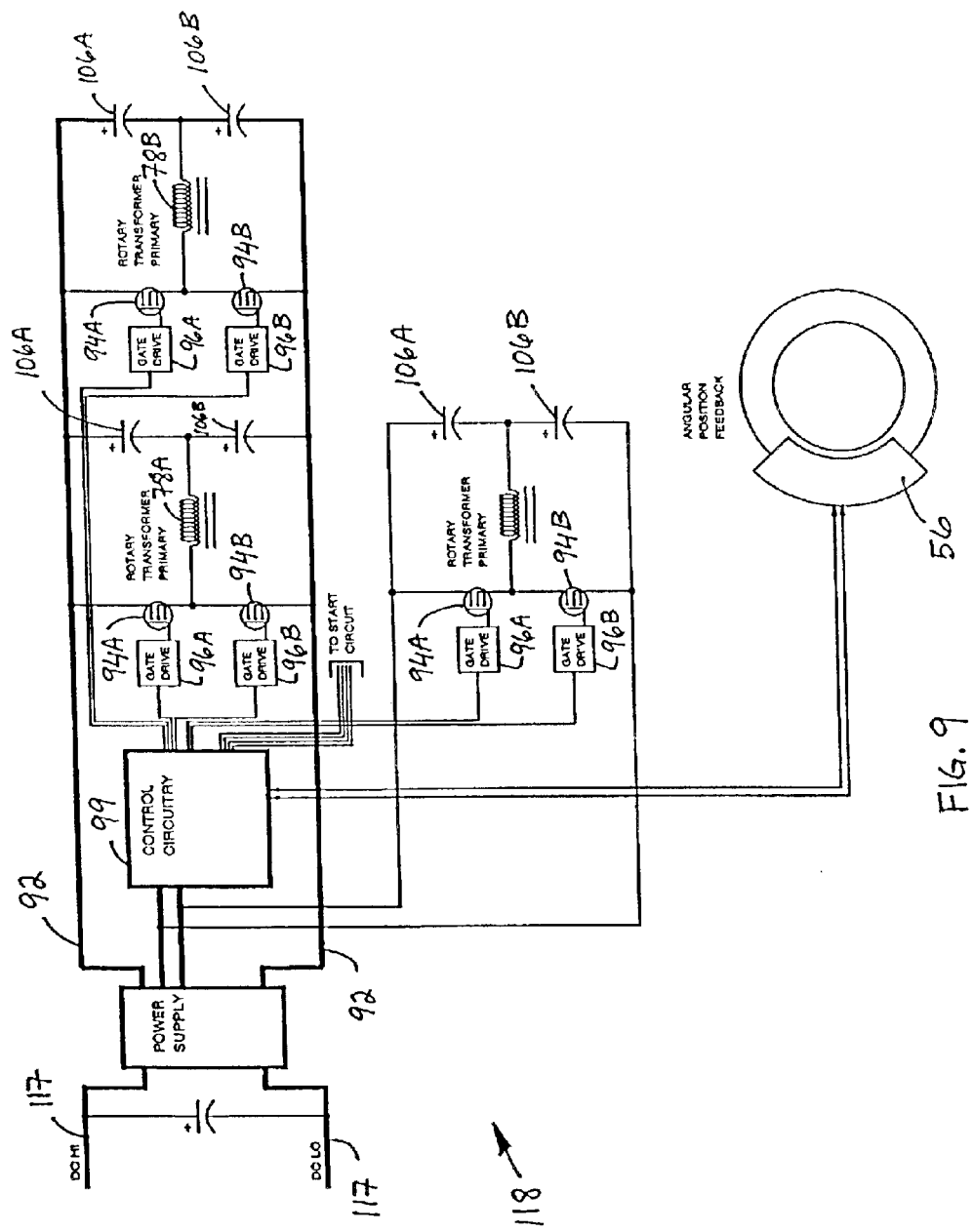
FIG. 9 illustrates one embodiment of a second control transformer drive circuit according to the present invention.
Figure 12:
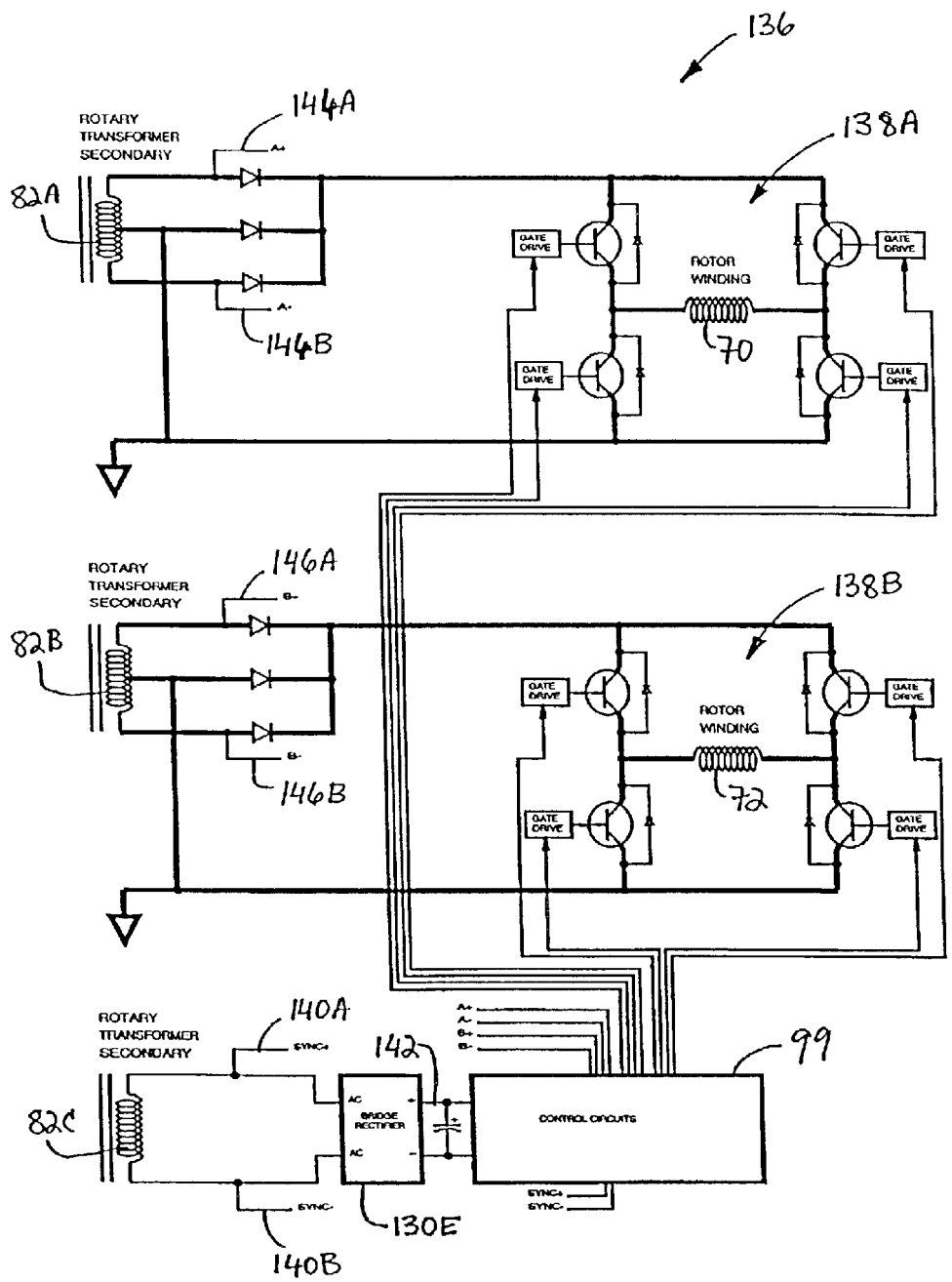
FIG. 12 illustrates one embodiment of a second rotor control circuit according to the present invention.

FIG. 9 illustrates one embodiment of a second control transformer drive circuit 118 for controlling three rotary transformers 77. The rotary transformers 77 include three rotary transformer primaries 78A, B, C and three rotary transformer secondaries 82A, B, C (as shown in FIG. 12). The second control transformer drive circuit 118 is one embodiment of a circuit for driving the three rotary transformer primaries 78A, B, C. The DC voltage that develops on the DC voltage bus 117 is rectified from the voltage supplied by the AC electrical power line 36 as shown in the start circuit 86 in FIG. 5, for example. Each of the rotary transformer primaries 78A, B, C can be driven by half-bridge of MOSFET transistors 94A, B and can be AC coupled to the DC voltage rails 92 via capacitors 106A, B. The half-bridge of MOSFET transistors 94A, B can be driven by gate drives 96A, B, which in turn are controlled by the control circuitry 99. In one embodiment of the second control circuit 118, the incremental cost of adding a sophisticated starting circuit (e.g., start circuit 86 and start circuit 100) is generally low. The second transformer drive circuit 118 also includes an angular position feedback control device 56 for providing the angular velocity and angular position of the rotor 14, for example.

Figure 10:
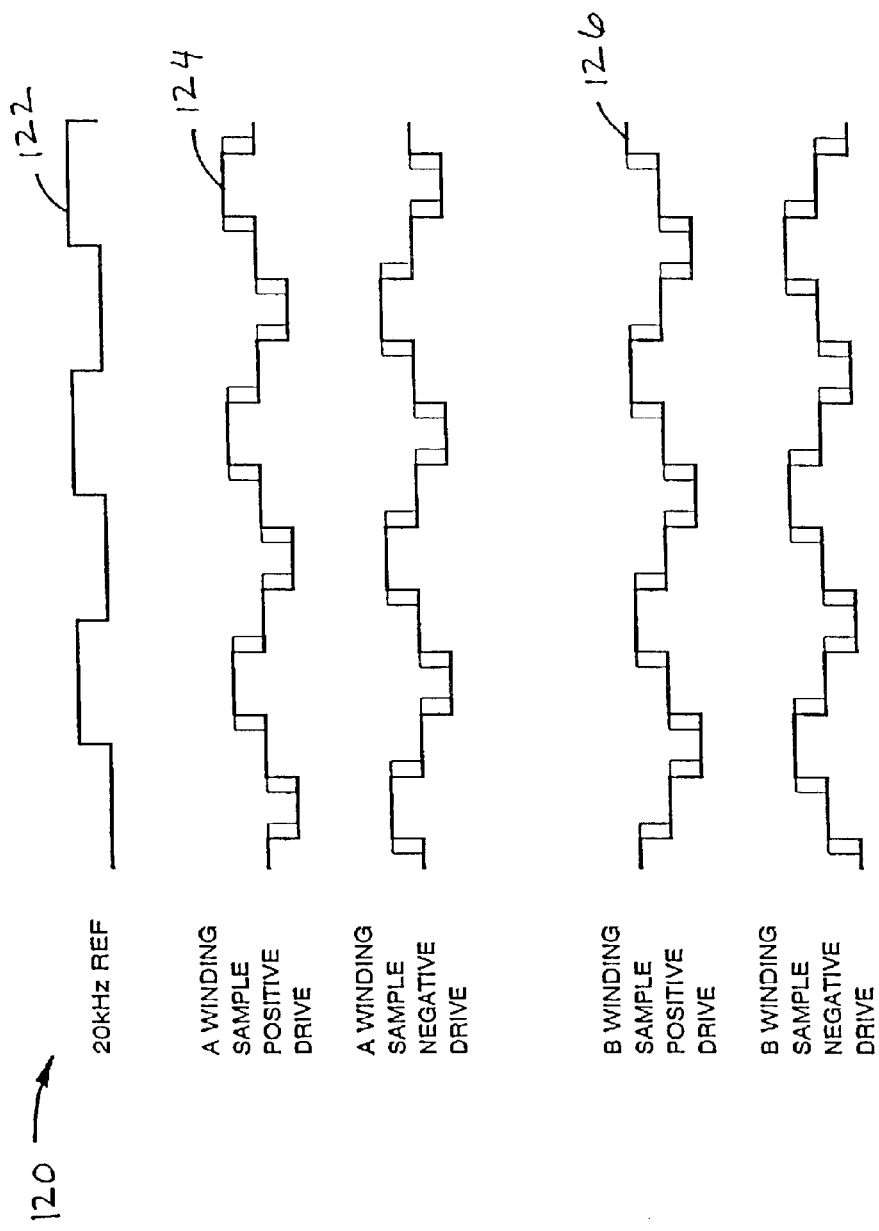
FIG. 10 illustrates one embodiment of a timing diagram for controlling three rotary transformers according to the present invention.

Turning now to FIG. 10, where there is illustrated one embodiment of a timing diagram 120 for controlling three rotary transformers 77 including three rotary transformer primaries 78A, B, C, as described in the description of the second control transformer drive circuit 118 above. In one embodiment, the timing diagram 120 provides one method of controlling the rotary transformers 77 that is a trade off between electronic complexity and number of components, for example utilizing three rotary transformers 77A, B, C rather than four rotary transformers 77A, B, C, D as described above with reference to the description of the first control transformer drive circuit 116. First, a 20 kHz reference signal 122 is provided. The "A" rotor winding drive signal 124 is in phase with the reference signal 122 while the "B" rotor winding drive signal 126 is ninety degrees out of phase with the reference signal 122. The direction of current desired in each winding is indicated by the polarity of the winding drive signal and the magnitude of current desired in each winding is indicated by the width of each positive or negative peak. The schematics associated with the timing diagram 120 are described in the description associated with FIG. 9 above relating to the rotary transformer primaries 78A, B, C (e.g., the stator circuits) and FIG. 12 below relating to the rotary transformer secondaries 82A, B, C (e.g., the rotor circuits).

FIG. 11 illustrates one embodiment of a first rotor control circuit 128 for controlling four rotary transformers 77 on the secondary side. The first rotor control circuit 128 is an electrical schematic of one circuit for connecting the rotor windings 70, 72 to the four rotary transformer secondaries 82A, B, C, D. The AC signals 76A, B, C, D from the rotary transformer secondaries 82A, B, C, D, respectively, are rectified by bridge rectifiers 130A, B, C, D, respectively. The AC signals 76A, B, C, D appear at the output of the rectifiers 130A, B, C, D as rectified signals 76A', B', C' and D', respectively. The rectified signals 76A', B', C' and D' are used to switch on the JFET transistors 132A, B, C, D, respectively. Those skilled in the art will appreciate that other transistors may be used without departing from the scope of the invention. When the JFET transistors 132A, B, C, D switch, they effectively create a short circuit from one end of the rotor winding 132A, B, C, D to ground through the JFET transistors 132A, B, C, D, respectively. In one embodiment, each of the rotor windings 70, 72 requires a separate circuit 128A and 128B, respectively. Only one of each pair of rotary transformer secondaries 82A, B, C, D, is operating at a given moment in time.

FIG. 12 illustrates one embodiment of a second rotor control circuit 136 for controlling three rotary transformers 77 on the secondary side. The second rotor control circuit 136 is an electrical schematic of one circuit for connecting the rotor windings 70, 72 to the three rotary transformer secondaries 82A, B, C. The first two rotary transformer secondaries 82A, B are used to supply power to the transistor H-bridges 138A, B for each rotor winding 70, 72, respectively, through half-bridge rectification. The third rotary transformer secondary 82C is used to provide a control signal 140A, B and to simultaneously supply power through bridge rectifier 130E at terminal 142 to the control circuitry 99. Note that the unrectified AC signals 144A, B and 146A, B from the rotary transformer secondaries 82A, B, respectively, are each input into the control circuitry 99 for determining the phase of each transformed signal. Gating together the 20 kHz reference signal 122 and each rotor winding 70, 72 power signals 124, 126 the control circuitry 99 has the information required for switching the rotor windings 70, 72 via the H-bridges 138A, B, respectively.

Figure 13:
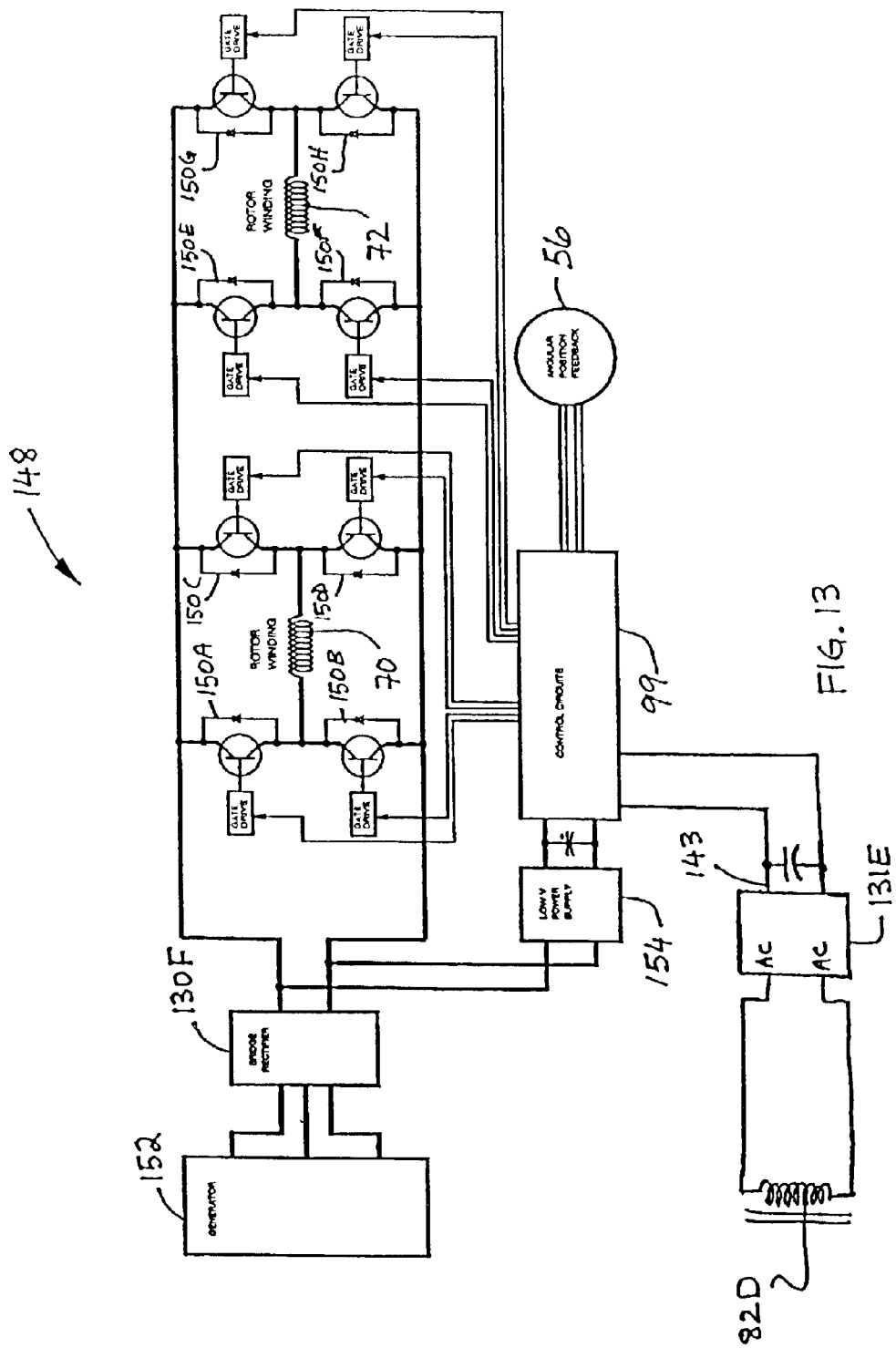
FIG. 13 illustrates one embodiment of a self-generated power rotor circuit according to the present invention.

FIG. 13 illustrates one embodiment of a self-generated power rotor circuit 148. The self-generated power rotor circuit 148 can be otherwise referred to as a self-powered rotor. At stationary conditions, or at very low speeds, the AC signals 76 developed in the stator 12 are coupled through the air gap 80B (See FIG. 17C) to the rotor windings 70, 72, which are then rectified through the transistor flyback protection diodes 150A–H. As the rotor 12 speed increases, the power from the generator 152 (here illustrated as a three-phase AC generator) begins to dominate and is rectified through bridge rectifier 130F. A low-voltage power supply 154 is shown to ensure that a stable power supply is provided to the control circuitry 99 at all speeds. In one embodiment, the self-generated power circuit 148 requires the phase 62 of the incoming AC electrical power to be transmitted across the rotating air gap 80A (See FIG. 17C). The rotary transformer secondary 82D can be used to supply power through the bridge rectifier 131E at terminal 143 to the control circuitry 99.

FIGS. 14A–C illustrate one embodiment of a first motor 156 having a mechanical rotor 14 that includes three rotary transformers 77A, B, C. FIG. 14C illustrates a side view of one embodiment of the first motor 156, a housing 164 and a stator 12 cut away to expose the rotor iron 170 and the stationary electronics 174, which can include various communication devices. At one end of the first motor 156, there are located the rotating electronics 172, the three rotary transformers 77A, B, C, and the position feedback device 56. The rotary transformers 77A, B, C each include the rotary transformer primary windings 78 and the rotary transformer secondary windings 82. Electrical power and signals can be transferred to and from the rotary transformer primary windings 78 and the rotary transformer secondary windings 82 across the air gap 80A. In one embodiment such components are located in the recited order from left to right. Each end of the shaft 158 is shown supported by a bearing 166. The rotating electronics 172 for the rotor 14 are described above as the second rotor control circuit 136 and is illustrated schematically in FIG. 12. FIG. 14A illustrates an end view of the first motor 156, showing the shaft 158, the rotor-winding end turns 160 and the stator-winding end turns 162. The external housing 164 and the bearing 166 have been omitted for clarity. FIG. 14B illustrates a sectional view of the rotor 14 of the first motor 156 in the winding area, showing the rotor-windings 70, 72, the stator windings 37, the central shaft 158 and the stator lamination stack 168.

FIGS. 15A–C illustrate one embodiment of a second motor 176 having a mechanical rotor 14 that includes four rotary transformers 77A, B, C, D. FIG. 15C illustrates a side view of one embodiment of the second motor 176, a housing 164 and the stator 12 cut away to expose the rotor iron 170 and the stationary electronics 174, which can include various communication devices. At one end of the second motor 176, there are located the rotating electronics 172, the four rotary transformers 77A, B, C, D and the position feedback device 56. The rotary transformers 77A, B, C, D each include the rotary transformer primary windings 78 and the rotary transformer secondary windings 82. Electrical power and signals can be transferred to and from the rotary transformer primary windings 78 and the rotary transformer secondary windings 82 across the air gap 80A. In one embodiment such components are located in the recited order from left to right. Each end of the shaft 158 is shown supported by the bearing 166. The rotating electronics 172 for the rotor 14 are described above as the first rotor control circuit 128 and are illustrated schematically in FIG. 11. FIG. 15A illustrates an end view of the second motor 176, showing the shaft 158, the rotor-winding end turns 160 and the stator-winding end turns 162. The external housing 164 and the bearing 166 have been omitted for clarity. FIG. 15B illustrates a sectional view of the rotor 14 of the second motor 176 in the winding area, showing the rotor-windings 70, 72, the stator-windings 37, the central shaft 158 and the stator lamination stack 168.

FIGS. 16A–C illustrate one embodiment of a third motor 178 having a mechanical rotor 14 with built-in permanent magnets 180 that includes free rotary transformers 77A, B, C. FIG. 16C illustrates a side view of one embodiment of the third motor 178, a housing 164 and the stator 12 cut away to expose the rotor iron 170 and the stationary electronics 174, which can include various communication devices. At one end of the third motor 178, there are located the rotating electronics 172, the three rotary transformers 77A, B, C and the position feedback device 56. The rotary transformers 77A, B, C each include the rotary transformer primary windings 78 and the rotary transformer secondary windings 82. Electrical power and signals can be transferred to and from the rotary transformer primary windings 78 and the rotary transformer secondary windings 82 across the air gap 80A. In one embodiment, such components are located in the recited order from left to right. Each end of the shaft 158 is shown supported by the bearing 166. The rotating electronics 172 for the rotor 14 are described above as the second rotor control circuit 136 and are illustrated schematically in FIG. 12. FIG. 16A illustrates an end view of the third motor 178, showing the shaft 158, the rotor-winding end turns 160 and the stator-winding end turns 162. Also shown in the end view of the third motor 178 is an end view of the built-in permanent magnets 180. The external housing 164 and the bearing 166 have been omitted for clarity. FIG. 16B illustrates a sectional view of the rotor 14 in the winding area, showing the rotor windings 70, 72 and the stator windings 37, the central shaft 158, the stator lamination stack 168 and a section of the built-in permanent magnets 180.

In one embodiment the rotor 14 of the third motor 178 is similar to the rotor 14 of the first motor 156 except for the addition of the permanent magnetic material comprising the built-in permanent magnet 180 within slots provided in one phase of the rotor 14. The flux provided by the built-in permanent magnet 180 obviates the need for having current in the rotor windings 70, 72 at a certain speed of the rotor 14, thus improving the overall efficiency of the third motor 178 at and near that certain speed. In one embodiment, however, the performance at other speeds may be degraded. The presence of the built-in permanent magnet 180 generally does not affect the operation of the various circuits illustrated in the schematics described above.

FIGS. 17A–C illustrate one embodiment of a fourth motor 182 having a mechanical rotor 14 that includes a generator 184 and a single rotary transformer 77A. In part, the power generated by the generator 184 is consumed by the rotary electronics 172. When the motor is stationary, power is coupled to the rotor windings across air gap 80B. FIG. 17C illustrates a side view of the fourth motor 182, the housing 164 and the stator 12 cut away to expose the rotor iron 170, the rotating electronics 172 and the stationary electronics 174, which can include various communication devices. At one end of the fourth motor 182, there are located the rotating electronics 172, one rotary transformer 77A, the power generator 184 and the position feedback device 56. The rotary transformer 77A includes the rotary transformer primary windings 78 and the rotary transformer secondary windings 82. Electrical power and signals can be transferred to and from the rotary transformer primary windings 78 and the rotary transformer secondary windings 82 across the air gap 80A. In one embodiment, such components are located from left to right in the order recited. Each end of the shaft 158 is shown supported by a bearing 166. The rotating electronics 172 for the rotor 14 are described above as the self-generated power rotor circuit 148 and are illustrated schematically in FIG. 13. FIG. 17A illustrates an end view of the fourth motor 182, showing the shaft 158, the rotor-winding end turns 160 and the stator-winding end turns 162. The exterior housing 164 and bearing 166 have been omitted for clarity. FIG. 17B illustrates a sectional view of the rotor 14 in the winding area, showing the rotor windings 70, 72, the stator windings 37, the central shaft 158 and the stator lamination 168.

Those skilled in the art will appreciate that each the first motor 156, the second motor 176, the third motor 178 and the fourth motor 182 can be operated as a first, second, third and fourth generator for generating AC power. Accordingly, instead of driving the stator 12 with the incoming AC electrical power line 36, the shaft 158 is rotated and the stator 12 is made to generate an AC current. The control of the speed and the phase of the generator are analogous to the operation of the first motor 156, the second motor 176, the third motor 178 and the fourth motor 182 described in detail above.

FIG. 18A illustrates a cross-section of one embodiment of a first mechanical rotary transformer 77. The rotary transformer 77 includes a ferrite portion 186, a primary winding 78 and a secondary winding 82. The rotary transformer secondary winding 82 is attached to the shaft 158 and rotates about the shaft 158. The signals 74 to be transferred to the rotor 14 are encoded to analog AC waveforms 76 and are coupled from the rotary transformer primary winding 78 to the rotary transformer secondary winding 82 across the air gap 80. In one embodiment, the rotary transformer 77 is formed in a manner whereby the rotary transformer secondary windings 82 rotate within the rotary transformer primary windings 78. This layout is a trade off between a large diameter and a small diameter as may be required in accordance with the shaft 158 length.

FIG. 18B illustrates a cross-section of one embodiment of a second mechanical rotary transformer 185. The rotary transformer includes a ferrite 186, a primary winding 188 and a secondary winding 190. The rotary transformer secondary winding 190 is attached to the shaft 158 and rotates about the shaft 158. The signals 74 to be transferred to the rotor 14, are encoded to analog AC waveforms 76 and are coupled from the rotary transformer primary winding 188 to the rotary transformer secondary winding 190 across the air gap 80C. In one embodiment, the second mechanical rotary transformer 185 is formed in a side-by-side manner, thus trading off space taken up by the shaft 158 for a smaller overall diameter.

The foregoing description of the specific embodiments of the various embodiments of the invention has been presented for the purpose of illustration and description. It is not intended to be exhaustive or to limit the investigation to the precise form disclosed. Many modifications and variations are possible in light of the above teachings. It is intended that the scope of the invention be limited not with the description above but rather by the claims appended hereto.

What is claimed is:

1. A motor, comprising:
   a stator containing a first winding and a second winding driven by an alternating current;
   a rotor arranged to rotate relative to the stator, the rotor containing a third winding and a fourth winding, the rotor generating a magnetic field having an amplitude and a phase angle relative to the alternating current;
   a first circuit in communication with the third and fourth windings for controlling the phase angle of the generated magnetic field and generating a rotating stator magnetic field that is in phase-lock with the alternating current;
   a second circuit in communication with and driving the first and second windings for controlling the rotational speed of the rotating stator magnetic field;
   a third circuit in communication with the third and fourth windings for controlling the magnitude of the generated magnetic field;
   a fourth circuit for controlling the magnitude of the rotating stator magnetic field; and
   a generator connected to the rotor for generating power for operating the circuit.

2. The motor of claim 1, wherein the third and fourth windings are disposed at a ninety-degree phase shift relative to each other.

3. The motor of claim 2, wherein the first circuit sequences a current through each of the third and fourth windings for generating the rotating stator magnetic field.

4. The motor of claim 1, further comprising a feedback device in communication with the first and second windings of the stator and the third and fourth windings of the rotor for determining motor parameters.

5. The motor of claim 1, wherein the first and second windings of the stator are disposed at a ninety-degree phase shift relative to each other.

6. The motor of claim 1, further comprising a rectifier disposed on the rotor for rectifying currents induced in the third and fourth rotor windings by magnetic flux generated by a powered stator.

7. The motor of claim 1, wherein the first circuit includes a microprocessor.

8. The motor of claim 1, wherein the rotor is formed using a permanent magnetic material and a control winding.

9. The motor of claim 1, wherein the first circuit further comprises means for transferring power for operating the circuit from a stationary portion of the motor to the rotor.

10. A motor comprising:
    a stator containing a first winding and a second winding driven by an alternating current;
    a rotor arranged to rotate relative to the stator, the rotor containing a third winding and a fourth winding, the rotor generating a magnetic field having an amplitude and a phase angle relative to the alternating current;
    a circuit in communication with the third and fourth windings for controlling the phase angle of the generated magnetic field and generating a rotating magnetic field that is in phase-lock with the alternating current; and
    a switch in communication with at least one of the third and fourth windings of the rotor for switching off the rotor at a predetermined rotor speed;
    wherein the circuit further comprises means for transferring power for operating the circuit from a stationary portion of the motor to the rotor.

11. The motor of claim 10, further comprising a generator connected to the rotor for generating power for operating the circuit.

12. A motor, comprising:
    a stator containing a first winding and a second winding driven by an alternating current;
    a rotor arranged to rotate relative to the stator, the rotor containing a third winding and a fourth winding, the rotor generating a magnetic field having an amplitude and a phase angle relative to the alternating current;
    a circuit in communication with the third and fourth windings for controlling the phase angle of the generated magnetic field and generating a rotating magnetic field that is in phase-lock with the alternating current; and
    a start circuit in communication with the first and second stator windings and the third and fourth rotor windings for driving the first stator winding at the first phase.

13. The motor of claim 12, wherein the start circuit includes a rectifier and a transistor bridge, the rectifier having an input portion for connecting to a source of alternating current and an output portion in communication with the transistor bridge for supplying direct current power to the transistor bridge, the transistor bridge for driving the second stator winding at a second phase by switching rectified direct current power from the rectifier into one end of the second rotor winding.

14. The motor of claim 13, wherein the transistor bridge is selected from the group consisting of an H bridge and a half-bridge.

15. The motor of claim 12, wherein the transistor bridge is disposed between the rectifier and one of the third and fourth rotor windings.

16. The motor of claim 12, further comprising a one phase circuit connectable at an input portion to a source of first alternating current and an output portion in communication with one of the first and second stator windings.

17. The motor of claim 16, wherein the one phase circuit provides functions selected from the group consisting of current limiting, thermal limiting and soft starting.

18. The motor of claim 12, wherein the starter circuit further comprises a thermal switch having an input portion connectable to a source of alternating current and an output portion in communication with one of the first and second stator windings.

19. The motor of claim 12, wherein the starter circuit further comprises a phase shifting capacitor connected in series with a centrifugal switch, the phase shifting capacitor and the centrifugal switch connectable between a source of alternating current and one of the third and fourth rotor windings.

20. A motor, comprising:
a stator containing a winding driven by an alternating current;
a rotor arranged to rotate relative to the stator, the rotor containing a winding, and the rotor generating a magnetic field having an amplitude and a phase angle relative to the alternating current;
a control transformer connected to the rotor, the control transformer containing a primary winding and a secondary winding, the control transformer secondary winding in communication with the rotor winding, wherein the control transformer is for transmitting control information and power to the rotor;
an active control circuit in communication with the control transformer primary winding, the control circuit in communication with the rotor winding for controlling the phase angle of the generated magnetic field and for generating a rotating magnetic field that is in phase-lock with the alternating current;
an angular position feedback device in communication with the control circuit for providing an instantaneous angular position of the rotor and an instantaneous angular velocity of the rotor to the control circuit; and
a power generator connected to the rotor shaft for supplying power to the control circuit.

21. The motor of claim 20, further comprising a start circuit disposed between the stator winding and the rotor winding, the start circuit in communication with the control circuit.

22. The motor of claim 21, further comprising a one-phase circuit in communication with the stator.

23. The motor of claim 21, further comprising a rectifier for rectifying power delivered by a source of alternating current, the rectifier in communication with a drive circuit for driving the rotor winding, the drive circuit in communication with the control circuit.

24. The motor of claim 21, further comprising a centrifugal switch.

25. The motor of claim 20, further comprising a drive circuit disposed between the control circuit and the control transformer primary.

26. The motor of claim 20, further comprising a rectifier disposed between the rotor wing and the control transformer secondary winding.

27. The motor of claim 20, wherein the control transformer is a rotary transformer.

28. A motor, comprising:
a stator containing a winding driven by an alternating current;
a rotor arranged to rotate relative to the stator, the rotor containing a winding, and the rotor generating a magnetic field having an amplitude and a phase angle relative to the alternating current;
a control transformer connected to the rotor, the control transformer containing a primary winding and a secondary winding, the control transformer secondary winding in communication with the rotor winding;
a control circuit in communication with the control transformer primary winding, the control circuit in communication with the rotor winding for controlling the phase angle of the generated magnetic field and for generating a rotating magnetic field that is in phase-lock with the alternating current;
an angular position feedback device in communication with the control circuit for providing an instantaneous angular position of the rotor and an instantaneous angular velocity of the rotor to the control circuit;
a start circuit disposed between the stator winding and the rotor winding, the start circuit in communication with the control circuit;
a thermal switch in communication with the stator winding for disconnecting a source of alternating current from the stator; and
a power generator connected to the rotor shaft for supplying power to the control circuit.

29. The motor of claim 28, further comprising a centrifugal switch in communication with the stator winding for disconnecting a source of alternating current from the stator winding.

30. The motor of claim 29, further comprising a phase-shift capacitor connected in series with the centrifugal switch.

31. A motor, comprising:
a stator containing a plurality of windings driven by an alternating current;
a rotor arranged to rotate relative to the stator, the rotor containing a plurality of windings, and the rotor generating a magnetic field having an amplitude and a phase angle relative to the alternating current;
a plurality of control transformers connected to the rotor shaft, the plurality of control transformers each containing a primary winding and a secondary winding, the plurality of control transformers each containing a secondary winding in communication with the plurality of rotor windings, wherein the plurality of control transformers is for transmitting control information and power to the rotor;
an active control circuit in communication with the plurality of control transformers primary windings, the control circuit in communication with the plurality of rotor windings for controlling the phase angle of the generated magnetic field and for generating a rotating magnetic field that is in phase-lock with the alternating current;
an angular position feedback device in communication with the control circuit for providing the instantaneous angular position of the rotor and the instantaneous angular velocity of the rotor to the control circuit; and
a power generator connected to the rotor shaft for supplying power to the control circuit.

32. The motor of claim 31, wherein the plurality of control transformers is a plurality of rotary transformers.

33. A motor, comprising:
a stator containing a first winding and a second winding driven by an alternating current;
a rotor arranged to rotate relative to the stator, the rotor containing a third winding and a fourth winding, the rotor generating a magnetic field having an amplitude and a phase angle relative to the alternating current;
means for controlling the phase angle of the generated magnetic field in communication with the means for transferring signals, the means for controlling in communication with the rotor winding, wherein the means for controlling is for transmitting control information and power to the rotor;
active means for generating a rotating magnetic field that is in phase-lock with the alternating current in communication with the means for transferring signals, the means for controlling in communication with the rotor winding;

and means for generating power connected to the rotor shaft for supplying power to the means for controlling.

34. A motor, comprising:

a stator containing a winding driven by an alternating current;

a rotor arranged to rotate relative to the stator, the rotor containing a winding, and the rotor generating a magnetic field having an amplitude and a phase angle relative to the alternating current;

means for transferring signals from a stationary portion of the motor to the rotor connected to the rotor, the means for transferring signals containing a primary winding and a secondary winding, the means for transferring signals in communication with the rotor winding, wherein the means for transferring signals is for transmitting control information and power to the rotor;

active means for controlling the phase angle of the generated magnetic field in communication with a control transformer primary winding, the means for controlling the phase angle of the generated magnetic field in communication with each of the rotor winding, the means for transferring signals and the rotor winding;

means for generating a rotating magnetic field that is in phase-lock with the alternating current in communication with the means for transferring signals;

and means for generating power connected to the rotor shaft for supplying power to the active means for controlling.

35. A motor, comprising:

a stator containing a plurality of windings driven by an alternating current;

a rotor arranged to rotate relative to the stator, the rotor containing a plurality of windings, and the rotor generating a magnetic field having an amplitude and a phase angle relative to the alternating current;

a plurality of means for transferring signals from a stationary portion of the motor to the rotor connected to the rotor shaft, the plurality of means for transferring signals containing a primary winding and a secondary winding, the plurality of means for transferring signals each containing a secondary winding in communication with the plurality of rotor windings, wherein the plurality of means for transferring signals is for transmitting control information and power to the rotor;

active means for controlling the phase angle of the generated magnetic field and for generating a rotating magnetic field that is in phase-lock with the alternating current, the means for controlling the phase angle in communication with each of the plurality of control transformers primary windings and the plurality of rotor windings;

means for providing an instantaneous angular position of the rotor and an instantaneous angular velocity of the rotor to the means for controlling the phase angle;

and means for generating power connected to the rotor shaft for supplying power to the active means for controlling.

36. A rotor, comprising:

a rotor arranged to rotate relative to a stator, the stator containing a first winding driven by an alternating current, the rotor comprising:

a second winding for generating a magnetic field having an amplitude and a phase angle relative to the alternating current;

a circuit in communication with the stator driving alternating current and the second winding for supplying power to the second winding and for generating a rotating magnetic field;

a control device disposed on the rotor for generating a rotating magnetic field; and a power generation device disposed on the rotor.

37. The rotor of claim 36, further comprising a magnetic material disposed on the rotor, wherein the magnetic material in conjunction with the second winding generates the rotating magnetic field.

38. The rotor of claim 37, wherein the magnetic material is a permanent magnet.

39. The rotor of claim 36, further comprising means for transferring power for operating the circuit from a stationary portion of the motor to the rotor.

40. A rotor of claim 39, wherein the means for transferring the power is selected from the group consisting of brushes, wheels on a track, non-contact power transmission devices, radio waves and rotary transformers.

41. The rotor of claim 36, wherein the circuit further comprises means for transferring control signals for controlling the phase angle of the generated magnetic field from a stationary portion of the motor to the rotor.

42. The rotor of claim 41, wherein the means for transferring the control signals is selected from the group consisting of brushes, wheels on a track, non-contact signal transmission devices, radio waves and rotary transformers.

43. The rotor of claim 36, further comprising a control device disposed on the rotor for generating a rotating magnetic field.

44. A rotor of, comprising:

a rotor arranged to rotate relative to a stator, the stator containing a first winding driven by an alternating current, the rotor comprising:

a second winding for generating a magnetic field having an amplitude and a phase angle relative to the alternating current;

a circuit in communication with the second winding for supplying power to the second winding and for generating a rotating magnetic field; and a generator connected to the rotor for generating power for operating the circuit.

* * * * *